United States Patent [19]
Shirasaka

[11] Patent Number: 6,008,312
[45] Date of Patent: *Dec. 28, 1999

[54] METHOD FOR PRODUCING MILLABLE POLYURETHANES AND POLYURETHANE ELASTOMERS

[76] Inventor: Hitoshi Shirasaka, 3-6, Shitte 2-Chome, Tsurumi-ku, Yokohama-shi, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/758,892

[22] Filed: Dec. 2, 1996

[51] Int. Cl.$^6$ .................................................... C08G 18/42
[52] U.S. Cl. ................................ 528/75; 528/80; 525/450
[58] Field of Search ........................ 528/75, 80; 525/450, 525/453, 458

[56] References Cited

U.S. PATENT DOCUMENTS

| | | | |
|---|---|---|---|
| 3,169,945 | 2/1965 | Hostettler | 528/355 |
| 3,663,515 | 5/1972 | Hostettler et al. | 528/80 |
| 3,899,467 | 8/1975 | Bonk et al. | 528/80 |
| 4,447,591 | 5/1984 | Watanabe | 528/80 |

FOREIGN PATENT DOCUMENTS

| | | |
|---|---|---|
| 2418803 | 9/1979 | France. |
| 52-69489 | 6/1977 | Japan. |
| 57-185313 | 11/1982 | Japan. |
| 63-196623 | 8/1988 | Japan. |
| 2-000628 | 1/1990 | Japan. |
| 6-192410 | 7/1994 | Japan. |
| 7-292083 | 11/1995 | Japan. |
| 2140436 | 11/1984 | United Kingdom. |

OTHER PUBLICATIONS

C.Seefried, Jr. J.V. Koleske, F.E. Critchfield Thermoplastic Urethane Elastomers. I. Effect of Soft Segment Variations Sep. 1975 Journal of Applied Polymer Science vol. 19, No. 9.

C.Seefried, Jr. J.V. Koleske, F.E. Critchfield Thermoplastic Urethane Elastomers. II. Effects of Variations in Hardsegment Concentration Sep. 1975 Journal of Applied Polymer Science vol. 19, No. 9.

Nitta Ind Corp. Patent Abstracts of Japan Dec. 19, 1991 JP 03 220224, vol. 015, No. 504 (C–0896).

*Primary Examiner*—Rachel Gorr
*Attorney, Agent, or Firm*—Huntley & Associates

[57] ABSTRACT

A method for producing millable polyurethanes by first producing a poly-ε-caprolactone based diol, the poly-ε-caprolactone based diol containing a controlled average number of caprolactone units and having a molecular weight distribution; and reacting the poly-ε-caprolactone based diol with a diisocyanate to produce a polyurethane with a restricted crystallizability having a rubber elasticity. The resulting millable polyurethanes exhibit excellent hydrolysis resistance, show no crystallization at low temperatures and have excellent mechanical properties.

13 Claims, 11 Drawing Sheets

METHOD FOR PRODUCING MILLABLE POLYURETHANES AND POLYURETHANE ELASTOMERS

BACKGROUND OF THE INVENTION

The present invention relates to a method for producing millable, polyester polyurethanes having increased resistance to hydrolysis while maintaining strength inherent in polyurethanes.

Polyurethane elastomers are classified into castable polyurethanes, millable polyurethanes, thermoplastic polyurethanes. Among these, castable polyurethanes are generally used because they have an excellent combination of properties. On the other hand, the millable polyurethanes are advantageous in that they can be processed using rolls, presses and like devices generally employed for processing rubbers.

The castable and thermoplastic polyurethanes are known to be representative examples of segmented elastomers such as thermoplastic elastomers and have both rubber elasticity and wear resistance and strength. When properties such as tear strength and wear resistance are important, polyurethanes have been used which comprise soft segments comprising a crystallizable long polyol chain such as polyethylene glycol adipate, polybutylene glycol adipate, polyhexanediol adipate, poly-ε-caprolactone and hard segments comprising a polyisocyanate and a short chain polyol and polyamine, with the hard segments preventing the crystallization of the soft segments. More specifically, under usual conditions, the ends of the soft segments are fixed randomly by the hard segments so that the crystallization of the soft segments is prevented to form amorphous polymer chains. As a result, the polymer as a whole exhibits rubber elasticity and when the polymer is deformed excessively, the soft segments, fixed randomly, exhibit orientation crystallizability. Accordingly, polyurethanes vary in the crystal conditions of the soft segments when they are under usual conditions or when they are under excessive deformation. This is why polyurethanes are excellent in wear resistance and strength. Thus, polyurethanes of the castable and thermoplastic types can contain high crystallizability polyols.

On the other hand, in the case of millable polyurethanes, which do not have the hard segments that are present in the castable or thermoplastic type polyurethanes, use of high crystallizability polyols causes crystallization at low temperatures or at normal temperatures, thus failing to show elastomeric behavior. As described above, in designing of the millable polyurethanes, it is impossible to use those polyols that show high crystallizability at ordinary conditions and, hence, various efforts have been made to design polyols so that they have a decreased crystallizability, such as introduction of side chains, random copolymerization, and the like. Under the circumstances, the polyols put in practice include polyester-based ones such as polyethylene propylene adipate and polyethylene butylene adipate, polyether-based ones such as tetrahydrofuran (THF)-alkyl glycidyl ether copolymers, and the like, which are polyols prepared by random polymerization so that structural regularity of the polymer is disturbed to decrease its crystallizability.

Further, the millable polyurethanes are classified into polyester polyurethanes and polyether polyurethanes. Generally, the polyester polyurethanes have low resistance to hydrolysis while the polyether polyurethanes are poor in resistance to thermal aging. The poor resistance to thermal aging of the polyether polyurethanes is an essential problem while the low resistance to hydrolysis of the polyester polyurethanes is not so serious since the resistance to hydrolysis can be improved relatively readily by decreasing the concentration of the ester groups. However, in the case of polyester polyurethanes, use of long straight chain diol adipates such as 1,4-butylene adipate and 1,6-hexylene adipate in order to decrease the concentration of the ester groups results in higher crystallizability so that the resulting polyurethanes cannot be used as millable polyurethanes, particularly at low temperatures, thus failing to give a practically useful polyurethane having a wide range of feasibility. Although poly-ε-caprolactone is generally used in castable or thermoplastic type polyurethanes as a raw material for producing hydrolysis resistant polyurethanes, it cannot be used in millable polyurethanes because of its high crystallizability. Further, it is generally adopted practice to homo- or copolymerize a long chain diol having a side chain such as a methyl group in order to decrease the concentration of the ester groups and, hence, the crystallizability thereof. For example, use of a homopolymer of 3-methyl-1,5-pentanediol adipate or use of copolyester of hexanediol and neopentyl glycol, no problem of crystallization occurs at low temperatures so that elastomers having excellent hydrolysis resistance can be obtained. However, on the other hand, sufficient mechanical strength inherent to polyurethanes, such as wear resistance, cannot be obtained. When dibasic acids other than adipic acid are used, the same results are obtained. As described above, the conventional approach for solving the problems of crystallization at low temperatures has been to resort to randomly disturbing the structural regularity of polyols and therefore when the polymer is deformed excessively the crystallization is prevented so that orientation crystallization tends to occur with difficulty, thus failing to give sufficient mechanical strengths that polyurethanes have inherently.

SUMMARY OF THE INVENTION

The present invention satisfies the need for producing a polyester based millable polyurethane to give a polyurethane that has excellent hydrolysis resistance, shows no crystallization at low temperatures as well as has excellent mechanical properties such as wear resistance.

Specifically, the present invention provides a method for producing a millable polyurethane, comprising the steps of:

producing a poly-ε-caprolactone based diol represented by formula (I)

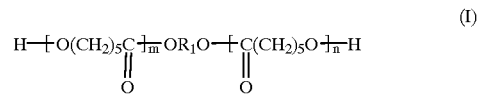

(I)

wherein [] is a caprolactone unit; m and n are numbers of caprolactone units; and $R_1$ is a divalent group derived from a polymerization initiator of formula $R_1(OH)_2$, the poly-ε-caprolactone based diol containing a controlled average number of caprolactone units and having a molecular weight distribution Mw/Mn of about from 1.0 to 1.5; and reacting the poly-ε-caprolactone based diol with a diisocyanate to produce a polyurethane with a restricted crystallizability having rubber elasticity.

DETAILED DESCRIPTION OF THE INVENTION

Figure 1:
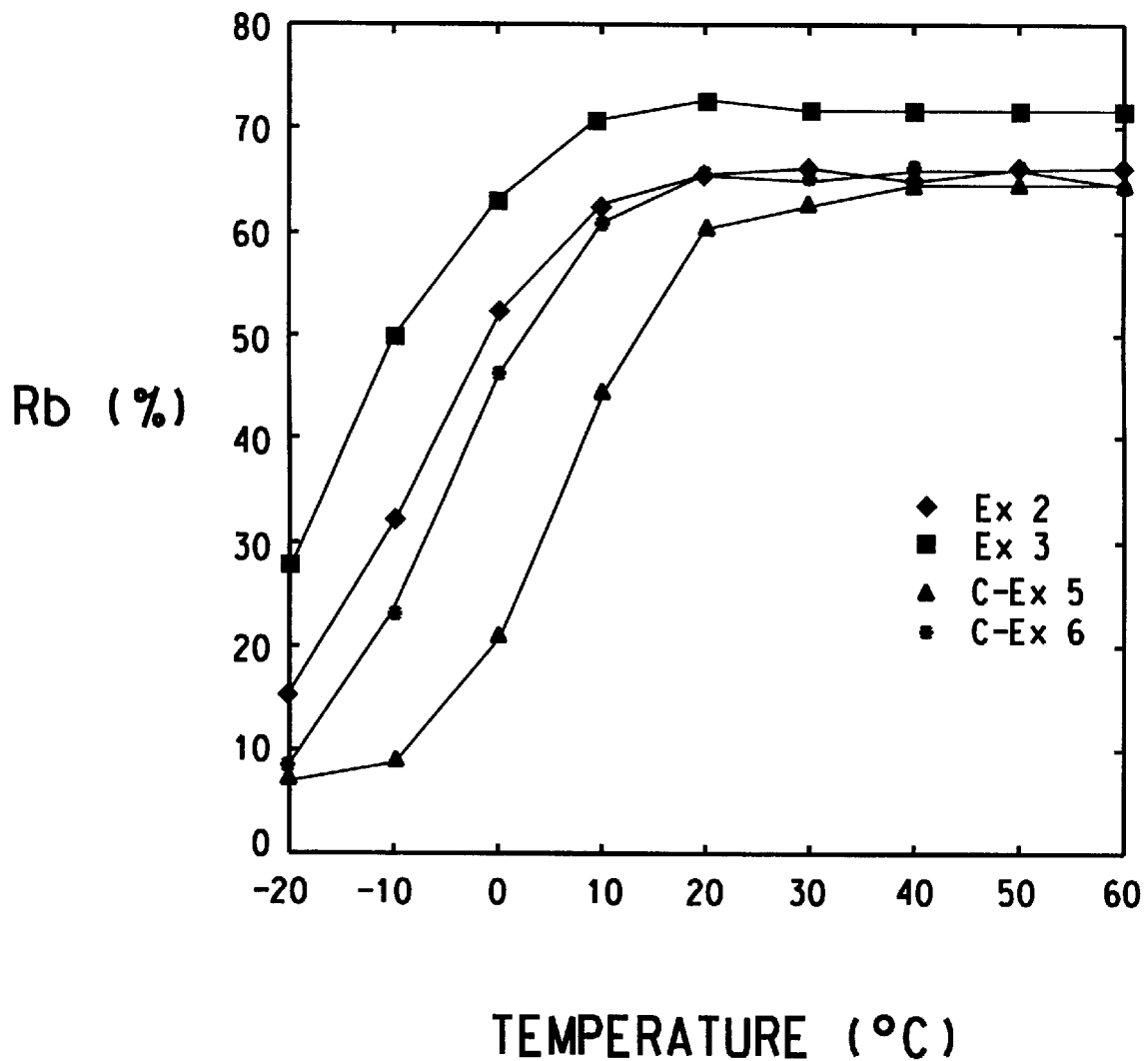
FIG. 1 is a diagram illustrating temperature dependence of ball rebound.
Figure 2:
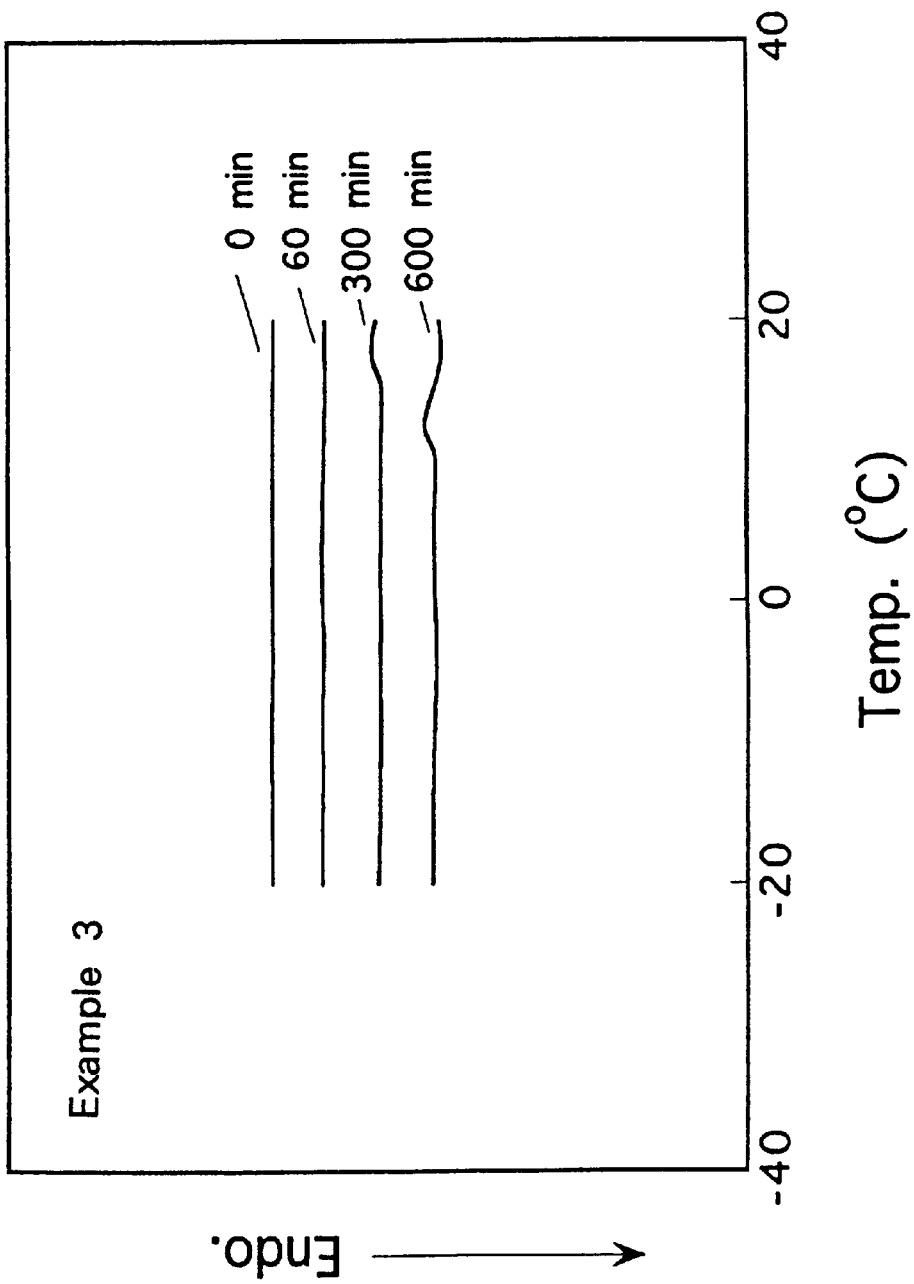
FIG. 2 is a diagram illustrating results of Differential Scanning Calorimeter (DSC) measurement of Example 3.
Figure 3:
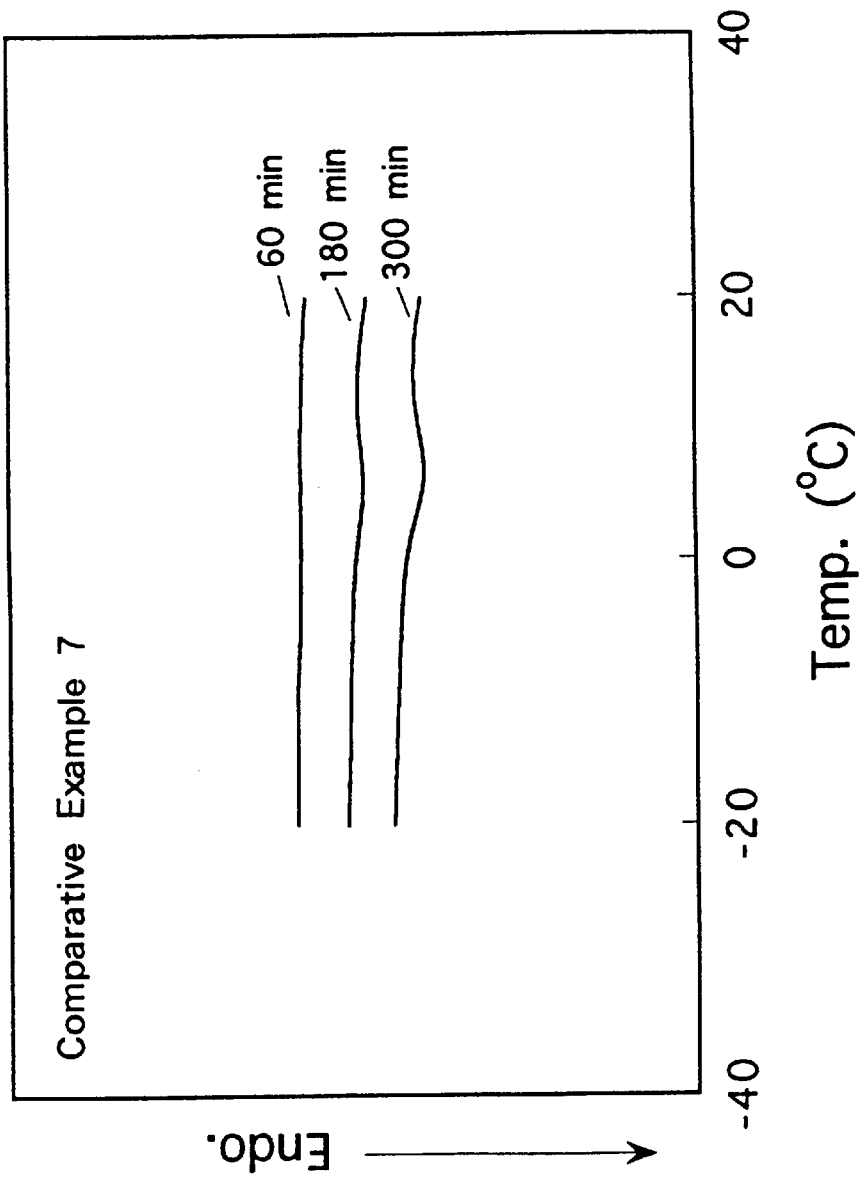
FIG. 3 is a diagram illustrating results of DSC measurement of Comparative Example 7.
Figure 4:
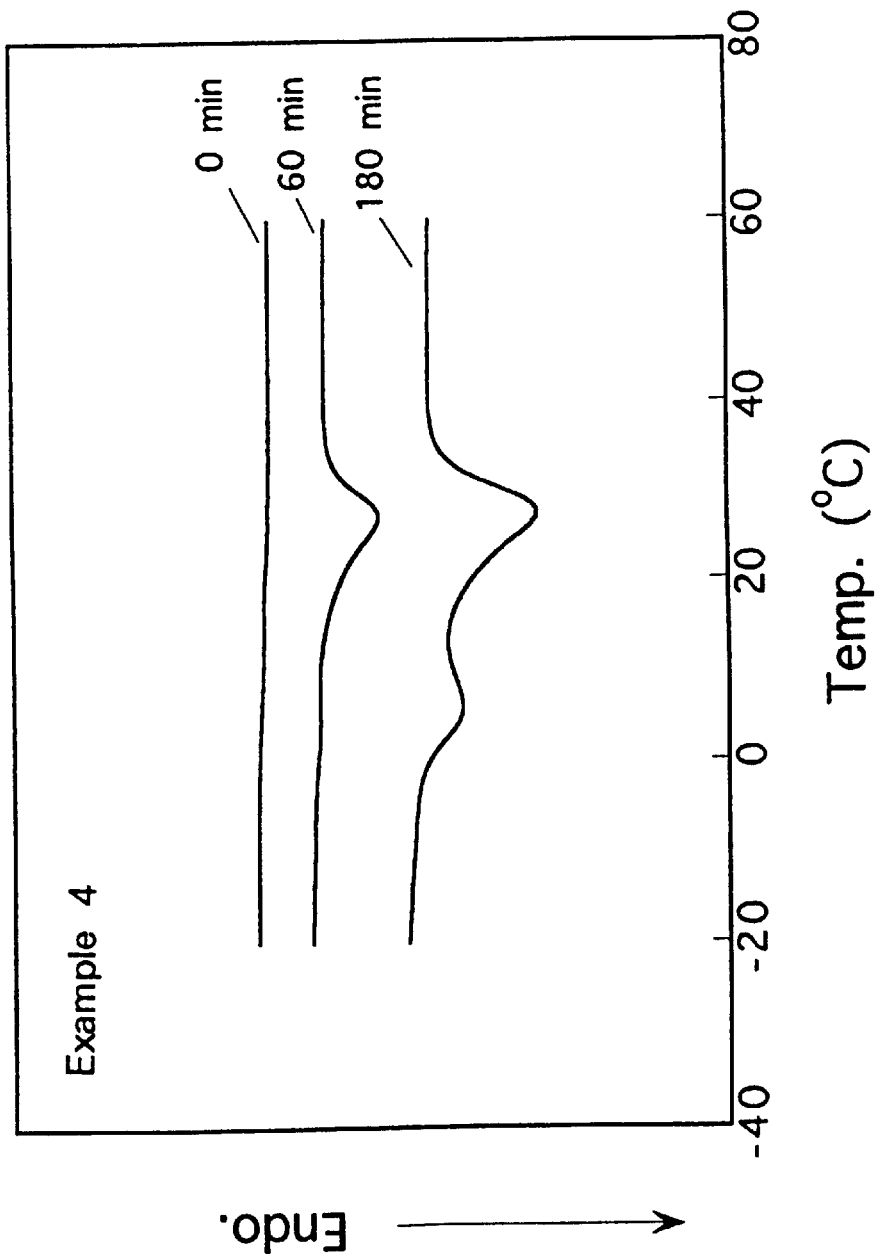
FIG. 4 is a diagram illustrating results of DSC measurement of Example 4.
Figure 5:
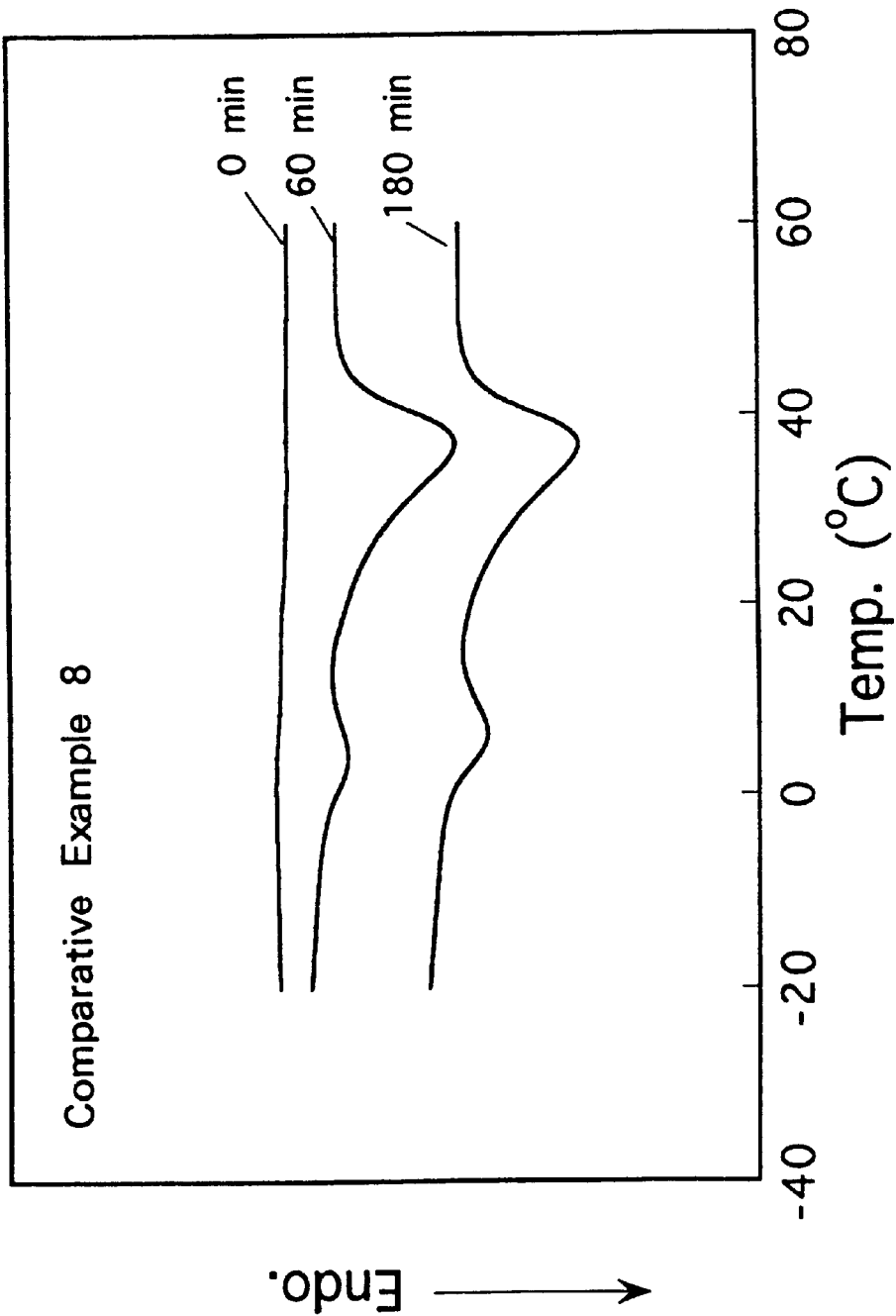
FIG. 5 is a diagram illustrating results of DSC measurement of Comparative Example 8.

The method of the present invention, unlike the conventional methods, controls the number and molecular weight distribution of caprolactone units, thereby making it possible to design polyurethane chains using ε-caprolactone, which is a monomer having too strong a crystallizability for it to be used in conventional methods. Accordingly, the present invention increases freedom to obtain polyurethanes having desired properties. More specifically, controlling the average number and molecular weight distribution of caprolactone units prevents the crystallization of ε-caprolactone due to the influence of a connecting part which is connected to the ε-caprolactone. Here, the connecting part comprises a moiety derived from the initiator for ring-opening polyurethanes thus prepared preferably have a glass transition temperature of no higher than about −20° C. in order for them to be useful as an elastomer when used alone. As is well known in the art, addition of plasticizers or other components and the like to the polyurethanes decreases their Glass Transition Temperature (Tg) substantially so that they can be used more suited for the purposes.

The method of the present invention enables one to control the average number and molecular weight distribution of caprolactone units in crystallizable oligomer comprising ε-caprolactone monomers, which in turn controls the crystallizability and amorphous property of the resulting polyurethane reversibly. As a result, it is possible to prepare high performance or high functional elastomers that act as a rubber elastic body in the deformation condition under normal environment because of prevention of crystallization whereas exhibit crystallizability under excessive deformation conditions. Preferably, the molecular weight distribution Mw/Mn of the poly-ε-caprolactone based diol is about from 1.0 to 1.3.

Polyurethanes comprising a polycaprolactone based polyol having a narrow molecular weight distribution are disclosed, for example, in Examined Published Japanese Patent Application (Kokoku) No. 39007/1988. This is intended to develop polyurethanes having improved recovery of elasticity. Polyols having narrow molecular weight distributions are disclosed in Examined Published Japanese Patent Application (Kokoku) No. 56251/1991,Unexamined Published Japanese Patent Application Kokai) No.292083/1995, and Unexamined Published Japanese Patent Application (Kokai) No. 196623/1988, respectively. They are intended to provide new polyols.

Heretofore, to the inventors' knowledge, there has been no idea of controlling, for example, the molecular weight and molecular weight distribution of polyol within an appropriate range before reaction with diisocyanate to control the crystallizability of the polyol for millable polyurethanes.

The present invention is based on the following discovery concerning poly-ε-caprolactone based polyols. The presence of poly-ε-caprolactone based polyols having ε-caprolactone units more than a predetermined value results in crystallization of the part connected to these poly-ε-caprolactone based polyols. On the other hand, increasing poly-ε-caprolactone based polyols having a molecular weight not larger than a predetermined molecular weight causes failure to decrease the glass transition temperature, Tg, of the polyurethane so that no desirable rubber elasticity can be obtained.

Using the method of the present invention, there is no decrease in mechanical properties such as wear resistance unlike the conventional methods in which use is made of monomers having a side chain such as a methyl group for copolymerization in order to decrease the crystallizability of the resulting polymer. The advantage of the method of the present invention is believed to be attributable to their capability of more speedy crystallization when the polyurethanes are drawn or stretched.

More specifically, in the method of the present invention, the crystallizability of crystallizable monomers can be controlled and hydrolysis resistance can be improved using initiators having no side chain such as a methyl group. In other words, use of initiators having no side chain can improve not only the hydrolysis resistance but also mechanical properties of the resulting polyester based polyurethane. Even when initiators with side chains are used, though mechanical properties are lower than those obtained using initiators having no side chain, there can be obtained millable polyurethanes containing ε-caprolactone units with excellent hydrolysis resistance.

The millable polyurethane used in the present invention can be obtained by the reaction between a long chain polyol and a diisocyanate.

As for the polyol to be used in the present invention, poly-ε-caprolactone based diol is used as a main component. The poly-ε-caprolactone based diol means a product of ring-opening polymerization of ε-caprolactone in the presence of a polymerization initiator having active hydrogen atoms and represented by the formula (I) above, among which, there is used in the present invention those in which the average number of caprolactone units (i.e., average values of m and n as described below) is within a predetermined range, and the molecular weight distribution, Mw/Mn, of the caprolactone unit moiety is about from 1.0 to 1.5, and preferably 1.0 to 1.3.

The reason why the average number of caprolactone units in the poly-ε-caprolactone based diol to be used in the present invention is limited within the predetermined range, for example, 3 to 6, is that in the millable polyurethane of the present invention comprising a caprolactone unit and a polyurethane linkage, the caprolactone unit maintains reversible conditions such that under conditions where no strong stress is applied, it becomes amorphous under the influences of the urethane linkages derived from diisocyanate and $R_1$ in the above formula. Thus, the caprolactone unit as a whole maintains the amorphous state to show elasticity while in a non-ordinary state where the poly-ε-caprolactone unit is subjected to a force such as tensile force and is going to ruin, the poly-ε-caprolactone unit exhibits its inherent orientation crystallizability, and contributes to the strength of the polyurethane. Also, the molecular weight distribution, Mw/Mn, of the caprolactone unit is set at about from 1.0 to 1.5, and preferably 1.0 to 1.3, in order to limit the amount of the molecules outside the upper limit of the predetermined range of the number of caprolactone units. That is, if the number of caprolactone units is greater than 6 or 8, for example, which may vary depending on $R_1$, the caprolactone units tend to crystallize under stress, particularly when stored at low and normal temperatures, and once the crystallization starts in this 6- or 8-caprolactone unit, those portions having 3 to 6 or 4 to 8 caprolactone units will also crystallize with ease. The crystallization at low temperatures depreciates the viscoelasticity, high friction coefficient and the like functions of the polyurethane as an elastomer substantially and is disadvantageous in that the environments of use and storage of the polyurethane are restricted greatly.

On the other hand, with smaller number of the caprolactone units than the predetermined number, Tg increases so that the polyurethanes can have insufficient rubber elasticity to be useful as an elastomer. The range where no acceptable rubber-like elasticity is exhibited depends on the type of $R_1$ in the above-described formula and the number of unit of 2 or less is undesirable when $R_1$ is derived from, for example, aliphatic diols and the number of unit of 3 or less is undesirable when $R_1$ is derived from, for example, diols having aromatic rings. The Tg of the elastomer can be adjusted by addition of plasticizers and the like and, hence, shorter repeating units can be selected depending on the purposes.

Unexamined Published Japanese Patent Application (Kokai) No. 628/1990, for example, discloses lactone polymers having narrow molecular weight distributions and suggests usefulness of such lactone polymers as a raw material for polyurethanes. However, the prior art described above is intended to lower the viscosity of the lactone polymer to improve its handling property but fails to suggest the method of the present invention. Furthermore, the description in the publication that the lactone polymer is useful as a raw material for polyurethanes, considered based on the state of the art at that time, means that it can be used as a raw material for castable polyurethanes and thermoplastic polyurethanes. The method for preparing lactones having a narrow molecular weight distribution disclosed in Unexamined Published Japanese Patent Application (Kokai) No. 196623/1988 aims at obtaining effects similar to that as above and suggests the present invention in no way.

That is, while high crystallizability raw materials such as ε-caprolactone polymers has been considered to be usable as polyol raw material for castable or thermoplastic polyurethanes comprising a hard segment made of an isocyanate and a chain extender and a polyol soft segment, it has been considered that no high crystallizability raw material can be used for millable polyurethanes comprising polyols extended by isocyanates and that there can be used only those polyols that have low crystallizability as a result of introduction of branching chains or comonomers. Accordingly, one skilled in the art would not expect to use high crystallizability lactone polymer as a raw material for producing millable polyurethanes on practically acceptable grades taking into consideration of prolonged use at low conventionally used for millable polyurethanes includes only a limited members of polyols such as ethylene propylene glycol adipate and ethylene butylene adipate.

The present invention, contrary to conventional teaching, controls the number of units in the caprolactone unit, thereby preventing the crystallization of the unit of poly-ε-caprolactone based polyol which inherently has a high crystallizability by means of the isocyanate units constituting the urethane linkages and the $R_1$ moiety in the formula described above and giving a millable polyurethane having an elasticity.

In the present invention, the polymerization initiator for forming the poly-ε-caprolactone based polyol, i.e., the original compound for constituting the above-described $R_1$ is not limited particularly and any compounds may be used as far as they have one or more active hydrogen atoms and form one or more diols after ring-open polymerization. Diols and diamines can be used for the purpose. However, in order to more remarkably exhibit the effects of the present invention, it is preferred to use those which have no molecular weight distribution, i.e., short chain polymerization initiators. The poly-ε-caprolactone based polyols formed with such short chain polymerization initiators can be defined, for example, as those having a molecular weight of $R_1$ of no greater than 500. Alternatively, they can also be defined as those having a total molecular weight of poly-ε-caprolactone based polyol of 800 to 1,500.

Such an initiator gives an influence on the crystallizability of the caprolactone unit as described above. Therefore, in the case where $R_1$ is a straight chain hydrocarbon, for example, the above-described average number of the caprolactone unit must be controlled to 3 to 6. For example, when $R_1$ is derived from an initiator having high steric hindrance such as an aromatic ring, an aliphatic ring, etc., the caprolactone unit, the average number of the caprolactone units may be controlled to 4 to 8. That is, in the method of the present invention, the average number of the caprolactone units is controlled to a predetermined number depending on the type of the polymerization initiator.

Examples of the short chain initiators which can be used in the present invention include straight chain glycols having 2 to 12 carbon atoms in the main chain thereof, such as ethylene glycol, 1,3-propylene glycol, and 1,4-butylene glycol; diols having a side chain and having up to 12 carbon atoms, such as neopentyl glycol and 3-methyl-1,5-pentanediol; diols having an unsaturated group and having up to 20 carbon atoms, such as 3-allyloxy-1,2-propanediol; and diols having an aromatic ring and having up to 12 carbon atoms, such as 1,4-bis (hydroxyethoxy) benzene and p-xylene glycol; alicyclic diols such as cyclohexanediol and cyclohexanemethanol; and the like. These short chain initiators may be used singly or two or more of them may be used in combination. Particularly preferred are 1,4-bis (hydroxyethoxy) benzene and p-xylene gylcol; and alicyclic diols, such as cyclohexanediol and cyclohexanedimethanol, and wherein the caprolactone unit is present in an average number of 4 to 8.

For producing poly-ε-caprolactone based polyols which are used in the present invention, selection of catalysts as well as ε-caprolactone and polymerization initiator is important. As the catalyst which can control the molecular weight distribution of polyol to narrow ranges, there can preferably be used metal compound catalysts containing halogens or organic acid radicals, for example, tin dihalides such as chloride, bromide, iodide, etc. and the tin based catalyst represented by formula (II) below.

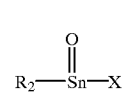

(II)

wherein $R_2$ is a hydrogen atom, an alkyl group, or an aryl group; and X is a hydroxyl group, an alkoxide group or a halogen atom other than fluoride.

In preparing the poly-ε-caprolactone based polyols with a narrow molecular weight distribution, which are used advantageously in the present invention, it is preferred to polymerize the corresponding ε-caprolactone monomers at low temperatures as low as, preferably, about 130° C. or below for a sufficient time using the tin based catalyst represented by formula (II) above, for example, monobutyltin oxide or tin halides excepting tin fluoride. In this manner, use of monobutyltin oxide or tin halides (excluding fluoride) can give rise to a mono-disperse poly-ε-caprolactones having a molecular weight distribution within the range of 1.0 to 1.3 even at temperatures within the range of about from 100 to 200° C. with a minimized possibility that crystallization occurs according as the polymerization reaction proceeds, thus allowing carrying out the reaction in the absence of solvents. On the contrary, the technique described in Unexamined Published Japanese Patent Application (Kokai) No. 196623/1988 polmerizes lactone by ring opening polymerization reaction with an inorganic acid catalyst at a temperature of about 100° C. or lower instead of 100° C. to 200° C. used in the preceding techniques to give highly mono-disperse lactone polymers having a molecular weight distribution within the range of about from 1.0 to 1.2. In the case of bulk polymerization reactions at such low temperatures, crystallization tends to occur according as the polymerization reaction proceeds so that it has been recommended to perform the reaction in the presence of inert organic solvents such as benzene and toluene. However, this requires an additional step of removing or recovering solvents from the reaction mixture after completion of the reaction, which could be a bar to perform the reaction on an industrial scale.

In the present invention, the above-described specified poly-ε-caprolactone based diol, which is a long chain polyol, is used as a main component of the polyol and in addition thereto a long chain polyol and chain extenders generally used can be employed in amounts within the range where the object of the present invention is not harmed. As the generally used long chain polyols, there can be used either polyester polyols or polyether polyols, or blends copolymerization products or partially modified products therefrom. Examples of the chain extenders include straight chain glycols having 2 to 12 carbon atoms in the main chain, such as ethylene glycol, thiodiethanol, propylene glycol, and butylene glycol; diols having an aromatic ring and having up to 20 carbon atoms, such as 1,4-bis (hydroxyethoxy) benzene and p-xylene glycol and hydrogenated products thereof. Additionally, triols such as trimethylol; or stearyl alcohol, hydroxyethyl acrylate, and the like can also be used.

In the case where the polyurethane obtained by the method of the present invention is crosslinked with sulfur, a compound having an unsaturated bond is used as a part of the polymerization initiator or chain extender in accordance with conventional manner.

Representative polyisocyanates which are reacted with such the above-described polyol for producing the polyurethane of the present invention include 2,6-toluene diisocyanate (TDI), 4,4'-diphenylmethane diisocyanate (MDI), p-phenylene diisocyanate (PPDI), 1,5-naphthalene diisocyanate (NDI), 3,3-dimethyldiphenyl-4,4'-diisocyanate (TODI), and the like. Use of 4,4'-diphenylmethane diisocyanate (MDI) is particularly preferred since it is known to act as a crosslinking site for crosslinking with peroxides.

Blend proportion of polyol to diisocyanate can be within generally used ranges. For example, active hydrogen such as hydroxyl group in the diol and isocyanate are blended in equimolar amounts. More specifically, for example, 25 parts by weight of MDI per 100 parts by weight of the diol is used for a hydroxyl number (OHv: KOHmg/g) of 112, 20.8 parts by weight of MDI per 100 parts by weight of diol for OHv of 94, 16.7 parts by weight of MDI per 100 parts by weight of diol for OHv of 75.

In the preparation of cured elastomers, the millable polyurethane of the present invention is kneaded or compounded with a curing agent and then heat cured or crosslinked. Examples of such a curing agent include organic peroxides, sulfur, organic sulfur-containing compounds, isocyanates, and the like for ordinary synthetic rubbers. In the present invention, generally, organic peroxides are used. Examples of the organic peroxides include dicumyl peroxide, α,α'-bis (t-butylperoxyisopropyl) benzene, and the like. The amount of the organic peroxide to be added is on the level of about from 0.5 to 10 parts by weight, preferably about from 1.5 to 5 parts by weight, per 100 parts by weight of combined polyol and isocyanate. It is in the case where the polymerization initiator or chain extender has an unsaturated bond, such as 3-allyl-1,2-propanediol, that sulfur and organic sulfur containing compounds can be used as a curing agent. Examples of the organic sulfur-containing compounds include thiuram based vulcanization promoters such as tetramethylthiuram disulfide (TMTD)), tetraethylthiuram disulfide (TETD), and dipentamethylenethiuram tetrasulfide (DPTT), 4,4'-dithiomorpholine, and the like.

Upon kneading and curing as described above, commonly used additives, i.e., reinforcing materials such as carbon black, silica, etc., detackifiers such as wax, plasticizers such as dioctyl phthalate (DOP) can be used.

The polyurethane of the present invention can also contain a hydrolysis preventing agent such as polycarbodiimide in amounts of about from 0.2 to 3 producing by weight per 100 parts by weight of the polyurethane in the same manner as in conventional methods. The polyurethane member of the present invention has an improved hydrolysis resistance twice or more as high as the conventional thermosetting millable polyurethanes and use of hydrolysis preventing agents in the polyurethane of the present invention in the same amount as the conventional polyurethanes the hydrolysis resistance of the polyurethane material of the present invention is increased accordingly while in order to obtain the same level of hydrolysis resistance as the conventional polyurethane materials, the amount of the additive to be added can be reduced by about 20% to 50% of the amount of the conventional additive. This contributes much to reduction in costs since the hydrolysis preventing agents are generally expensive.

The millable polyurethane of the present invention can generally be reacted at temperature of about from 70° C. to 150° C. for about from 30 to 10 hours and thereafter aged if necessary at 40° C. to 120° C. for about from 6 to 48 hours. The heat curing conditions of the millable polyurethane may be determined depending on the decomposition properties of the organic peroxide to be used but generally it is preferred that the heat curing conditions are set within the range of 150 to 180° C. for 3 to 60 minutes.

The present invention is further illustrated in greater detail in the following Examples and Comparative Examples.

Production Example 1: Production of Poly-ε-Caprolactone Based Diols

Ethylene glycol as a polymerization initiator and ε-caprolactone in respective amounts shown in Table 1 were reacted in the presence of $SnCl_2$ or TBT as a catalyst to prepare various poly-ε-caprolactone based diols.

Here, the diols of the group of Examples 1 to 4 and A) had a molecular weight distribution as narrow as about 1.4 while the diols of the group of Comparative Examples 4 to 10 (hereafter, referred to as Group B) had a molecular weight distribution of about 2.2, which value was within the range usually used in the conventional techniques. Table 1 shows the amount of catalyst and reaction temperature used in each reaction, the designed and calculated values of the number of ε-caprolactone units, designed and found values of average molecular weight, and molecular weight distribution (Mw/Mn).

Here, the average molecular weights were determined by measuring the hydroxyl number of polyols according to JIS K1557-6.4 and calculating by the following equation:

Molecular Weight=56.1×N×1000/Hydroxyl Number where N is the number of functional groups in the polymerization initiator.

Further, the molecular weight distribution was determined by gel permeation chromatography (GPC) under the following conditions:
Apparatus: LC-3A, SHIMAZU SEISAKUSHO;
Solvent: Tetrahydrofuran (1 ml/min.)
Temperature: 50° C.

| Column: | Shodex | KF801 | 1 tube |
|---|---|---|---|
| | | KF8025 | 1 tube |
| | | KF804 | 1 tube |

Detector: RID-6A, SHIMAZU SEISAKUSHO

TABLE 1

| | Ex | C-Ex | Ini. K. | ε-CL P. | CAT K. | ppm | R.Temp °C. | NCl Dd. | AMW Dd. | AMW Md. | NCl Cd. | Mw/Mn |
|---|---|---|---|---|---|---|---|---|---|---|---|---|
| A | 1 | | EG | 62 | 570 | SnCl$_2$ | 5 | 150 | 2.5 | 632 | 616 | 2.4 | 1.4 |
| | | 1 | EG | 62 | 684 | SnCl$_2$ | 5 | 150 | 3 | 746 | 810 | 3.3 | 1.4 |
| | 2 | | EG | 62 | 912 | SnCl$_2$ | 5 | 150 | 4 | 974 | 999 | 4.1 | 1.3 |
| | 3 | | EG | 62 | 1140 | SnCl$_2$ | 5 | 150 | 5 | 1202 | 1163 | 4.8 | 1.4 |
| | 4 | | EG | 62 | 1368 | SnCl$_2$ | 5 | 150 | 6 | 1430 | 1480 | 6.2 | 1.3 |
| | | 2 | EG | 62 | 1596 | SnCl$_2$ | 5 | 150 | 7 | 1658 | 1647 | 7.0 | 1.4 |
| | | 3 | EG | 62 | 1938 | SnCl$_2$ | 5 | 150 | 8.5 | 2000 | 1991 | 8.5 | 1.4 |
| B | 4 | | EG | 62 | 570 | TBT | 10 | 170 | 2.5 | 632 | 641 | 2.5 | 2.3 |
| | 5 | | EG | 62 | 684 | TBT | 10 | 170 | 3 | 746 | 792 | 3.2 | 2.2 |
| | 6 | | EG | 62 | 912 | TBT | 10 | 170 | 4 | 974 | 974 | 4.0 | 2.1 |
| | 7 | | EG | 62 | 1140 | TBT | 10 | 170 | 5 | 1202 | 1184 | 4.9 | 2.3 |
| | 8 | | EG | 62 | 1368 | TBT | 10 | 170 | 6 | 1430 | 1460 | 6.1 | 2.1 |
| | 9 | | EG | 62 | 1596 | TBT | 10 | 170 | 7 | 1658 | 1699 | 7.2 | 2.2 |
| | 10 | | EG | 62 | 1938 | TBT | 10 | 170 | 8.5 | 2000 | 1991 | 8.5 | 2.3 |

Ex.: Example; C-Ex.: Comparative Example
Ini.: Initiator, K.: Kinds, P.: Parts,
ε-CL: ε-caprolactone, P.: Parts
CAT: Catalyst, K.: Kinds
R.Temp: Room Temperature
NCl (Dd.) :Designed values of the number of ε-caprolactone units,
AMW (Dd.) :Designed values of average molecular weight
AMW (Md.) :Measured values of average molecular weight
NCl (Cd.) :Calculated values of the number of ε-caprolactone units

Production Example 2: Production of Millable Polyurethane

Each of the poly-ε-caprolactone based polyols and equimolar amount of 4'-diphenylmethane diisocyanate (MDI) were reacted at 100° C. for 5 hours to obtain various millable polyurethanes.

In order to evaluate the properties of the millable polyurethanes thus obtained as an amorphous polymer chain their Tg, and the stability during storage at low temperatures was examined. The stability during storage at low temperatures was judged from their flexibility at temperatures of −15° C., 5° C. and 25° C. Table 2 shows the results obtained.

As a result, it was observed that in both group A having a narrower molecular weight distribution and group B having a broader molecular weight distribution, the crystallizability of the polyurethanes increased with an increased average number of ε-caprolactone units. Group A had a wider temperature range than group B at which the amorphous state can be maintained.

TABLE 2

| | | | Ini. K. | NCl (Dd.) | Mw/Mn | Tg °C. | Properties of GUM (Prop. after 3 days) | | |
|---|---|---|---|---|---|---|---|---|---|
| | Ex | C-Ex | | | | | −15° C. | 5° C. | 25° C. |
| A | 1 | | EG | 2.4 | 1.4 | −10 | Am | Am | Am |
| | | 1 | EG | 3.3 | 1.4 | −24 | Am | Am | Am |
| | 2 | | EG | 4.1 | 1.3 | −33 | Am | Am | Am |
| | 3 | | EG | 4.8 | 1.4 | −37 | Cry | Am | Am |
| | 4 | | EG | 6.2 | 1.3 | −41 | Cry | Cry | Am |
| | | 2 | EG | 7.0 | 1.4 | −45 | Cry | Cry | Cry |
| | | 3 | EG | 8.5 | 1.4 | −48 | Cry | Cry | Cry |
| B | 4 | | EG | 2.5 | 2.3 | −12 | Am | Am | Am |
| | 5 | | EG | 3.2 | 2.2 | −24 | Am | Am | Am |
| | 6 | | EG | 4.0 | 2.1 | −34 | Cry | Am | Am |
| | 7 | | EG | 4.9 | 2.3 | −38 | Cry | Cry | Am |
| | 8 | | EG | 6.1 | 2.1 | −42 | Cry | Cry | Cry |
| | 9 | | EG | 7.2 | 2.2 | −46 | Cry | Cry | Cry |
| | 10 | | EG | 8.5 | 2.3 | −48 | Cry | Cry | Cry |

Ex.: Example, C-Ex.: Comparative Example
Ini.: Initiator, K.: Kinds, P.: Parts,
Tg: Glass transition temperature
NCl (Dd.): Designed values of the number of ε-caprolactone units,
Properties of GUM: Properties of polyurethane
Prop. After 3 days: Properties after standing at each temp. for 3 days
Am: Amorphous
Cry: Crystallization

Production Example 3: Production of Crosslinked Polyurethane

To 100 parts by weight of each of the millable polyurethanes produced as described above was added 1.5 parts by weight of dicumyl peroxide (NIPPON FATS & OIL; PERCUMYL D (trade name)) and the mixture was kneaded in an open roll and press-molded at 160° C. for 20 minutes to obtain various crosslinked elastomers.

Measurement of Physical Properties

These crosslinked elastomers were measured for hardness (Hs: JIS A scale) according to JIS K6253, ball rebound (Rb: %) according to JIS K6255 (based on ISO 4662), tensile strength (Tb: MPa) and elongation (Eb: %) according to JIS K6251 (based on ISO 37), tear strength using a notched, an angled test piece (Tr: N/mm) according to JIS K6252 (based on ISO 34). Table 3 shows the results obtained. Further, the crosslinked elastomers were also measured for hardness after standing at various temperatures for 3 days. Table 3 also shows the results of these tests. Furthermore, Samples 3, 4, 9, and 10 were measured for temperature dependence of ball rebound at −20° C. to 60° C. FIG. 1 illustrates the results.

Each crosslinked elastomer was observed for the phenomenon of "cold hardening", i.e., an increase in hardness from the hardness after standing at various temperature for 3 days due to crystallization. Then, the elastomers produced using poly-ε-caprolactone having a molecular weight of 1,500 (average number of units of 6) suitable for use in conventional castable elastomers showed an increase in hardness even at temperatures near normal temperature. In those elastomers that were produced using poly-ε-caprolactone units of 3 or less showed no crystallizability but temperature dependence of the physical properties of the elastomer increases unacceptably at around normal temperature so that the resulting elastomer is unsuitable. On the other hand, use of poly-ε-caprolactone gave rise to elastomers which are less dependent on temperature without increasing the hardness.

These facts suggest that an increase in hardness due to crystallization is considered to depend on the number of lactone monomer units and on the contrary, the number of units exceeds a predetermined value, the crystallizability of the polymer increases too high for the polymer to be suitable as an amorphous polymer chain in elastomers. When the average number of monomer units is below a predetermined value (e.g., below 3), the concentration of urethane group in the amorphous polymer chain increases so that Tg of the polymer chain increases and gives an adverse influence on the temperature dependence. Therefore, in order for the elastomers to have low glass transition temperatures sufficient for practical purposes (e.g., −20° C. or below) while prevented from crystallizing, it is useful to highly control the molecular weight distribution of poly-ε-caprolactone. Further, based on the knowledge that what is crystallized is the poly-ε-caprolactone unit, it is considered possible to finely control the crystallizability of the poly-ε-caprolactone unit, which was impossible by the conventional techniques, by selectively arranging molecules that control the crystallization of the linkage unit at both ends thereof.

TABLE 3

|   |    |     |    |    |      |     |      | \multicolumn{4}{c}{Hs (after 3days)} |
|---|----|-----|----|----|------|-----|------|---------|--------|---------|---------|
|   | Ex | C-Ex | Hs | Rb | Tb   | Eb  | Tr   | −20° C. | 0° C.  | 10° C.  | 20° C.  |
|   |    | 1   | 53 | 48 | 12.8 | 560 | 23.7 | 95      | 55     | 52      | 50      |
|   | 1  |     | 53 | 60 | 18.5 | 520 | 25.8 | 54      | 54     | 53      | 53      |
|   | 2  |     | 53 | 66 | 19.2 | 520 | 23.7 | 52      | 53     | 53      | 53      |
| A | 3  |     | 52 | 72 | 17.4 | 510 | 28.6 | 65      | 54     | 54      | 53      |
|   | 4  |     | 53 | 69 | 18.5 | 510 | 38.5 | 85      | 92     | 92      | 52      |
|   |    | 2   | 54 | 71 | 24.1 | 520 | 49.8 | 94      | 93     | 93      | 85      |
|   |    | 3   | 55 | 73 | 24.8 | 520 | 57.7 | 94      | 93     | 93      | 87      |
|   |    | 4   | 54 | 52 | 15.3 | 540 | 25.1 | 90      | 55     | 54      | 53      |
|   |    | 5   | 49 | 60 | 18.8 | 520 | 23.6 | 55      | 54     | 49      | 49      |
|   |    | 6   | 48 | 66 | 20.2 | 510 | 31.5 | 85      | 87     | 52      | 47      |
| B | 7  |     | 53 | 72 | 19.3 | 540 | 28.3 | 85      | 89     | 88      | 53      |
|   | 8  |     | 54 | 74 | 23.1 | 510 | 41.7 | 91      | 93     | 93      | 79      |
|   | 9  |     | 92 | 65 | 24.2 | 520 | 44.2 | 95      | 95     | 94      | 94      |
|   | 10 |     | 93 | 65 | 23.8 | 550 | 57.7 | 96      | 95     | 94      | 94      |

Ex.: Example, C-Ex.: Comparative Example
Hs (after 3 days): Hardness after standing at various temperature for 3 days

Production Example 4: Production of Poly-ε-Caprolactone Based Diol

Ethylene glycol as a polymerization initiator and ε-caprolactone in respective amounts shown in Table 5 were reacted using various amounts of catalyst and at various temperatures to prepare various poly-ε-caprolactone based diols.

Here, the diols of the group of Examples 5 to 7 and Comparative Examples 11 and 12 (hereafter, referred to as Group C) had a fixed average number of ε-caprolactone units of 6 and a varied molecular weight distribution within the range of 1.15 to 2.13 while the diols of the group of Examples 8 to 10 and Comparative Examples 13 and 14 (hereafter, referred to as Group D) had a fixed average number of ε-caprolactone units of 5 and a varied molecular weight distribution within the range of 1.18 to 2.21. Table 4 shows the amount of catalyst and reaction temperature used in each reaction, the designed and calculated values of the number of ε-caprolactone units, designed and found values of average molecular weight, and molecular weight distribution (Mw/Mn).

TABLE 4

| Ex | C-Ex | Ini. K. | Ini. P. | ε-CL P. | CAT K. | CAT ppm | R.Temp °C. | NCl Dd. | AMW Dd. | AMW Md. | NCl Cd. | Mw/Mn |
|---|---|---|---|---|---|---|---|---|---|---|---|---|
| C |    | EG | 62 | 1368 | TBT   | 10 | 170 | 6 | 1430 | 1457 | 6.1 | 2.13 |
|   | 11 | EG | 62 | 1368 | SnCl₂ | 5  | 170 | 6 | 1430 | 1414 | 5.9 | 1.86 |
|   | 12 | EG | 62 | 1368 | SnCl₂ | 5  | 150 | 6 | 1430 | 1407 | 5.9 | 1.45 |
| 5 |    | EG | 62 | 1368 | MBTO  | 50 | 150 | 6 | 1430 | 1478 | 6.2 | 1.29 |
| 6 |    | EG | 62 | 1368 | MBTO  | 50 | 120 | 6 | 1430 | 1451 | 6.1 | 1.15 |
| 7 |    | EG | 62 | 1140 | TBT   | 10 | 170 | 5 | 1202 | 1211 | 5.0 | 2.21 |
| D | 13 | EG | 62 | 1140 | SnCl₂ | 5  | 170 | 5 | 1202 | 1238 | 5.2 | 1.83 |
|   | 14 | EG | 62 | 1140 | SnCl₂ | 5  | 150 | 5 | 1202 | 1216 | 5.1 | 1.41 |
| 8 |    | EG | 62 | 1140 | MBTO  | 50 | 150 | 5 | 1202 | 1254 | 5.2 | 1.28 |
| 9 |    | EG | 62 | 1140 | MBTO  | 50 | 120 | 5 | 1202 | 1170 | 4.9 | 1.18 |
| 10|    |    |    |      |       |    |     |   |      |      |     |      |

Ex.: Example, C-Ex.: Comparative Example
Ini.: Initiator K.: Kinds, P.: Parts,
ε-CL: ε-caprolactone, P.: Parts
CAT: Catalyst, K.: Kinds
R.Temp: Room Temperature
NCl (Dd.) :Designed values of the number of ε-caprolactone units,
AMW (Dd.) :Designed values of average molecular weight
AMW (Md.) :Measured values of average molecular weight
NCl (Cd.) :Calculated values of the number of ε-caprolactone units Production Example 5: Production of Millable Polyurethane In the same manner as in Production Example 1 above, each of the poly-ε-caprolactone based polyols and equimolar amount of 4,4'-diphenylmethane diisocyanate (MDI) were reacted at 100° C. for 5 hours to obtain various millable polyurethanes.

In order to evaluate the properties of the millable polyurethanes thus obtained as an amorphous polymer chain their Tg, was measured and also evaluate the stability during storage at low temperatures, their crystallizability was judged from their flexibility at temperatures of −15° C., 5° C. and 25° C. Table 5 shows the results obtained.

TABLE 5

| Ex | C-Ex | Ini. K. | NCl (Dd.) | Mw/Mn | Tg °C. | Properties of GUM (Prop. after 3 days) −15° C. | 5° C. | 25° C. |
|---|---|---|---|---|---|---|---|---|
| C |    | EG | 6.1 | 2.13 | −42 | Cry | Cry | Cry |
|   | 11 | EG | 5.9 | 1.86 | −42 | Cry | Cry | Cry |
|   | 12 | EG | 5.9 | 1.45 | −41 | Cry | Cry | Am |
| 5 |    | EG | 6.2 | 1.29 | −41 | Cry | Cry | Am |
| 6 |    | EG | 6.1 | 1.15 | −41 | Cry | Cry | Am |
| 7 |    | EG | 5.0 | 2.21 | −38 | Cry | Cry | Am |
| D | 13 | EG | 5.2 | 1.83 | −39 | Cry | Cry | Am |
|   | 14 | EG | 5.1 | 1.41 | −37 | Cry | Am | Am |
| 8 |    | EG | 5.2 | 1.28 | −37 | Am | Am | Am |
| 9 |    | EG | 4.9 | 1.18 | −37 | Am | Am | Am |
| 10|    |    |     |      |     |    |    |    |

Ex.: Example, C-Ex.: Comparative Example
Ini.: Initiator, K.: Kinds, P.: Parts,
Tg: Glass transition temperature
NCl (Dd.): Designed values of the number of ε-caprolactone units,
Properties of GUM: Properties of polyurethane
Prop. After 3 days: Properties after standing at each temp. for 3 days
Am: Amorphous
Cry: Crystallization Production Example 6: Production of Crosslinked Polyurethane Various crosslinked polyurethanes were prepared in the same manner as described in Production Example 1 from the millable polyurethanes produced as described in Production Example 2, Each of the crosslinked polyurethanes was measured for physical properties as described above. Table 6 shows the results obtained.

The change in hardness of the crosslinked polyurethanes indicated that the molecular weight distribution of poly-ε-caprolactone based diol, raw material, gave a considerable influence on an increase in hardness due to a decreased crystallization at low temperatures (cold hardening) of elastomers and use of polyols having a very narrow molecular weight distribution made it possible to provide millable elastomers having controlled low temperature crystallizability. The present invention attained maximal effects by the use of polyols similar to mono-disperse polyols as having a molecular weight distribution of 1.5 or less, preferably 1.3 or less, which indicates distribution of caprolactone units. In other words, because the average number of units can be made greater under the conditions where the crystallizability is controlled or limited, it is possible to obtain a glass transition temperature sufficient for practical use as a rubber elastic body so that amorphous elastomers comprising highly crystallizable units that have been contradictory in the prior art can be produced using general purpose production facilities used in rubber industry. Here, the "glass transition sufficient for practical use" may be defined, for example, −20° C. This is because at a glass transition temperature of −20° C. or higher, the rubber elasticity observed at normal temperature cannot be maintained at those low temperatures which are encountered ordinarily, such as 0° C.

TABLE 6

| | | | | | | | | Property of Elastomers | | | |
| | | | | | | | | | Hs (after 3days) | | |
| Ex | C-Ex | Hs | Rb | Tb | Eb | Tr | −20° C. | 0° C. | 10° C. | 20° C. |
|---|---|---|---|---|---|---|---|---|---|---|
| C | 11 | 54 | 74 | 23.1 | 510 | 41.7 | 91 | 93 | 93 | 79 |
|  | 12 | 55 | 70 | 21.5 | 520 | 39.8 | 92 | 94 | 94 | 85 |
| 5 |  | 53 | 71 | 18.5 | 510 | 38.5 | 85 | 92 | 92 | 52 |
| 6 |  | 53 | 72 | 17.6 | 500 | 38.5 | 85 | 92 | 88 | 52 |
| 7 |  | 52 | 72 | 18.5 | 520 | 36.1 | 88 | 90 | 89 | 53 |
| D | 13 | 53 | 72 | 19.3 | 540 | 28.3 | 85 | 89 | 88 | 53 |
|  | 14 | 55 | 71 | 16.5 | 490 | 25.3 | 87 | 90 | 86 | 55 |
| 8 |  | 52 | 72 | 17.4 | 510 | 28.6 | 65 | 54 | 54 | 53 |
| 9 |  | 54 | 70 | 18.1 | 520 | 30.2 | 54 | 53 | 53 | 54 |
| 10 |  | 54 | 70 | 17.4 | 510 | 28.8 | 53 | 54 | 53 | 53 |

Ex.: Example, C-Ex.: Comparative Example
Hs (after 3 days): Hardness after standing at various temperature for 3 days Production Example 7: Production of Poly-ε-Caprolactone Based Diol As shown in Table 9, each of the polymerization initiators selected from 1,4-butanediol (1,4-BD), 1,5-pentanediol (1,5-PD), 1,6-hexanediol (1,6-HD), nonanediol (NP), neopentyl glycol (NPG), 3-methyl-1,5-pentanediol (3MPG), cyclohexanedimethanol (CHDM), p-xylene glycol (PXG), 1,4-bis(hydroxyethoxy)benzene (BHEB), and BPE-20 (SANYO KASEI KOGYO CO., LTD., trade name: an adduct of bisphenol A with 1 mole of ethylene oxide added to each end thereof) was reacted with ε-caprolactone under predetermined conditions to prepare poly-ε-caprolactone based diols of Examples 11 to 53. For each run, the reaction was carried out under nitrogen flow and the process was continued until the remaining caprolactone monomer was reduced to 1% or less as measured by gas chromatography.

Table 7 shows the amount of catalyst and reaction temperature used in each reaction, the designed and calculated values of the number of ε-caprolactone units, designed and found values of average molecular weight, and molecular weight distribution (Mw/Mn).

TABLE 7

| | Ini. | ε-CL | CAT | | R.Temp | AMW | AMW | NCl | |
| Example | K. | P. | P. | K. | ppm | °C. | Dd. | Md. | Cd. | Mw/Mn |
|---|---|---|---|---|---|---|---|---|---|---|
| 11 | 1,4-BD | 87 | 913 | MBTO | 50 | 120 | 1000 | 1017 | 4.1 | 1.24 |
| 12 | 1,4-BD | 90 | 979 | MBTO | 50 | 120 | 1069 | 1070 | 4.3 | 1.20 |
| 13 | 1,4-BD | 90 | 1140 | MBTO | 50 | 120 | 1230 | 1206 | 4.9 | 1.15 |
| 14 | 1,4-BD | 90 | 1360 | MBTO | 50 | 120 | 1450 | 1424 | 5.9 | 1.18 |
| 15 | 1,4-BD | 90 | 1596 | MBTO | 50 | 120 | 1686 | 1645 | 6.8 | 1.17 |
| 16 | 1,5-PD | 104 | 916 | MTBO | 50 | 120 | 1020 | 1020 | 4.0 | 1.18 |
| 17 | 1,5-PD | 104 | 1026 | MTBO | 50 | 120 | 1130 | 1107 | 4.4 | 1.18 |
| 18 | 1,5-PD | 104 | 1140 | MTBO | 50 | 120 | 1244 | 1228 | 4.9 | 1.15 |
| 19 | 1,5-PD | 104 | 1368 | MTBO | 50 | 120 | 1472 | 1446 | 5.9 | 1.14 |
| 20 | 1,5-PD | 104 | 1596 | MTBO | 50 | 120 | 1700 | 1667 | 6.9 | 1.19 |
| 21 | 1,6-HD | 118 | 798 | MTBO | 50 | 120 | 916 | 923 | 3.5 | 1.20 |
| 22 | 1,6-HD | 118 | 902 | MTBO | 50 | 120 | 1020 | 1009 | 3.9 | 1.18 |
| 23 | 1,6-HD | 118 | 1140 | MTBO | 50 | 120 | 1258 | 1243 | 4.9 | 1.17 |
| 24 | ND | 160 | 860 | MTBO | 50 | 120 | 1020 | 1012 | 3.7 | 1.16 |
| 25 | ND | 160 | 1140 | MTBO | 50 | 120 | 1300 | 1272 | 4.9 | 1.15 |
| 26 | NPG | 104 | 912 | MTBO | 50 | 120 | 1016 | 1021 | 4.0 | 1.27 |
| 27 | NPG | 104 | 1026 | MTBO | 50 | 120 | 1130 | 1143 | 4.6 | 1.31 |
| 28 | NPG | 104 | 1140 | MTBO | 50 | 120 | 1244 | 1240 | 5.0 | 1.35 |
| 29 | NPG | 104 | 1472 | MTBO | 50 | 120 | 1472 | 1476 | 6.0 | 1.23 |
| 30 | NPG | 104 | 1596 | MTBO | 50 | 120 | 1700 | 1697 | 7.0 | 1.23 |
| 31 | 3-MPD | 118 | 882 | MTBO | 50 | 120 | 1000 | 1001 | 3.9 | 1.24 |
| 32 | 3-MPD | 118 | 1026 | MTBO | 50 | 120 | 1144 | 1152 | 4.5 | 1.15 |
| 33 | 3-MPD | 118 | 1140 | MTBO | 50 | 120 | 1258 | 1271 | 5.1 | 1.33 |
| 34 | 3-MPD | 118 | 1368 | MTBO | 50 | 120 | 1486 | 1413 | 5.7 | 1.18 |
| 35 | 3-MPD | 118 | 1596 | MTBO | 50 | 120 | 1714 | 1708 | 7.0 | 1.26 |
| 36 | CHDM | 144 | 876 | MBTO | 50 | 120 | 1020 | 1021 | 3.8 | 1.18 |
| 37 | CHDM | 144 | 1140 | MBTO | 50 | 120 | 1284 | 1264 | 4.9 | 1.15 |
| 38 | CHDM | 144 | 1368 | MBTO | 50 | 120 | 1512 | 1476 | 5.8 | 1.16 |
| 39 | CHDM | 144 | 1482 | MBTO | 50 | 120 | 1626 | 1587 | 6.3 | 1.14 |
| 40 | CHDM | 144 | 1710 | MBTO | 50 | 120 | 1854 | 1801 | 7.3 | 1.15 |
| 41 | PXG | 138 | 882 | MTBO | 50 | 120 | 1020 | 1025 | 3.9 | 1.26 |
| 42 | PXG | 138 | 1140 | MTBO | 50 | 140 | 1278 | 1323 | 5.2 | 1.21 |
| 43 | PXG | 138 | 1368 | MTBO | 50 | 140 | 1506 | 1556 | 6.2 | 1.26 |
| 44 | PXG | 138 | 1596 | MTBO | 50 | 120 | 1734 | 1784 | 7.2 | 1.14 |
| 45 | PXG | 138 | 1824 | MTBO | 50 | 120 | 1962 | 2014 | 8.2 | 1.15 |

TABLE 7-continued

| Example | Ini. K. | ε-CL P. | CAT P. | CAT K. | ppm | R.Temp °C. | AMW Dd. | AMW Md. | NCl Cd. | Mw/Mn |
|---|---|---|---|---|---|---|---|---|---|---|
| 46 | BHEB | 198 | 1140 | MTBO | 50 | 120 | 1338 | 1320 | 4.9 | 1.15 |
| 47 | BHEB | 198 | 1368 | MTBO | 50 | 120 | 1566 | 1554 | 5.9 | 1.16 |
| 48 | BHEB | 198 | 1596 | MTBO | 50 | 120 | 1794 | 1784 | 7.0 | 1.14 |
| 49 | BHEB | 198 | 1824 | MTBO | 50 | 120 | 2022 | 2011 | 8.0 | 1.14 |
| 50 | BPE-20 | 316 | 1140 | MTBO | 50 | 120 | 1456 | 1418 | 4.8 | 1.19 |
| 51 | BPE-20 | 316 | 1368 | MTBO | 50 | 120 | 1684 | 1662 | 5.9 | 1.19 |
| 52 | BPE-20 | 316 | 1596 | MTBO | 50 | 120 | 1912 | 1861 | 6.8 | 1.18 |
| 53 | BPE-20 | 316 | 1824 | MTBO | 50 | 120 | 2140 | 2093 | 7.8 | 1.18 |

Ini.: Initiator, K.: Kinds, P.: Parts;
ε-CL: ε-caprolactone, P.: Parts
CAT: Catalyst, K.: Kinds
R.Temp: Room Temperature
NCl (Dd.) :Designed values of the number of ε-caprolactone units,
AMW (Dd.) :Designed values of average molecular weight
AMW (Md.) :Measured values of average molecular weight
NCl (Cd.) :Calculated values of the number of ε-caprolactone units
MBTO: Monobutyl tin oxide
TBT: Tetrabutyl titanate Production Example 8: Production of Millable Polyurethane Each of the poly-ε-caprolactone based polyols and equimolar amount of 4,4'-diphenylmethane diisocyanate (MDI) were reacted at 100° C. for 5 hours in the same manner as in Production Example 1 above to obtain various millable polyurethanes.

In order to evaluate the properties of the millable polyurethanes thus obtained as an amorphous polymer chain their Tg, was measured and also evaluate the stability during storage at low temperatures, their crystallizability was judged from their flexibility at temperatures of −15° C., 5° C. and 25° C. Table 5 shows the results obtained. Here, the relative crystallizability was obtained by measuring heat of fusion of a sample using differential scanning calorimeter (DSC) after holding the sample at −10° C. for 10 hours and comparing the data with those of natural rubber, followed by rating them based on the following classes: weak (W), medium (M) and strong (S). Table 8 shows the results obtained.

As a result, it revealed that setting simple parameters such as the kind of polymerization initiator and average number of monomer units enables one to finely or precisely control the crystallizability of the amorphous polymer chain in elastomers.

While the crystallizability of crosslinked elastomers can be controlled to some extent by crosslinking or by use of additives, elastomers of the rank "strong" of relative crystallizability are difficult to employ at normal temperature (20° C.) since there is the fear that they could cause inconveniences due to crystallizability. Therefore, in the systems using aliphatic diols as a polymerization initiator, the average number of monomer units should be 6 or less. In other words, when the average number of monomer units is 7 or more, crystallization occurs even at room temperature so that the polyurethane cannot be used as a polymer chain in elastomers. Further, if the polymerization initiator has a methyl group as a side chain, crystallization decreases but strength also decreases considerably. On the other hand, introduction of substituents which are bulky in a plane such as a benzene ring and a cyclohexane ring, instead of a methyl group, relaxes crystallizability to a suitable extent while at the same time imparting ability of exhibiting orientation crystallizability when stretched, thereby giving elastomers having high strength. When cyclic structures are introduced in the molecule as described above, the crystallizability is relaxed and therefore polyurethanes with an average number of lactone units of up to about 8 can be used. However, since the introduction of cyclic structures also increases the Tg of the polymer chain, it is desirable to use polyurethanes with an average number of lactone units of 4 or more in order to have a Tg of −20° C. or lower.

TABLE 8

| EX | CAT K. | NCl (Cd.) | Mw/Mn | Tg °C. | R. Cry. −10° C. |
|---|---|---|---|---|---|
| 11 | 1,4-BD | 4.1 | 1.24 | −35.8 | W |
| 12 | 1,4-BD | 4.3 | 1.20 | −36.5 | W |
| 13 | 1,4-BD | 4.9 | 1.15 | −40.5 | M |
| 14 | 1,4-BD | 5.9 | 1.18 | −45.3 | M–S |
| 15 | 1,4-BD | 6.8 | 1.17 | −48 | S |
| 16 | 1,5-BD | 4.0 | 1.18 | −35.2 | W |
| 17 | 1,5-BD | 4.4 | 1.18 | −37.2 | W |
| 18 | 1,5-BD | 4.9 | 1.15 | −40.1 | M |
| 19 | 1,5-BD | 5.9 | 1.14 | −44.2 | M–S |
| 20 | 1,5-BD | 6.9 | 1.19 | −46.4 | S |
| 21 | 1,6-HD | 3.5 | 1.20 | −31.2 | W |
| 22 | 1,6-HD | 3.9 | 1.19 | −33.8 | W |
| 23 | 1,6-HD | 4.9 | 1.17 | −40.2 | M |
| 24 | ND | 3.7 | 1.16 | −32.6 | W |
| 25 | ND | 4.9 | 1.15 | −41.3 | M |
| 26 | NPG | 4.0 | 1.27 | −32.8 | W |
| 27 | NPG | 4.6 | 1.31 | −35.3 | W |
| 28 | NPG | 5.0 | 1.35 | −38.9 | W |
| 29 | NPG | 6.0 | 1.23 | −42.6 | M–S |
| 30 | NPG | 7.0 | 1.23 | −45.5 | S |
| 31 | 3-MPD | 3.9 | 1.21 | −34.8 | W |
| 32 | 3-MPD | 4.5 | 1.15 | −35.2 | W |
| 33 | 3-MPD | 5.1 | 1.33 | −38 | W |
| 34 | 3-MPD | 5.7 | 1.18 | −39.4 | M |
| 35 | 3-MPD | 7.0 | 1.26 | −44 | S |
| 36 | CHDM | 3.8 | 1.18 | −21 | W |
| 37 | CHDM | 4.9 | 1.15 | −34.4 | W |
| 38 | CHDM | 5.8 | 1.16 | −38.8 | M |
| 39 | CHDM | 6.3 | 1.14 | −40.4 | M–S |
| 40 | CHDM | 7.3 | 1.15 | −43.7 | M–S |
| 41 | PXG | 3.9 | 1.26 | −22.2 | W |
| 42 | PXG | 5.2 | 1.21 | −30.3 | W |
| 43 | PXG | 6.2 | 1.26 | −34.9 | M |
| 44 | PXG | 7.2 | 1.14 | −38.4 | M–S |
| 45 | PXG | 8.2 | 1.15 | −41 | S |
| 46 | BHEB | 4.9 | 1.15 | −23.4 | W |
| 47 | BHEB | 5.9 | 1.16 | −28.9 | M |

TABLE 8-continued

| EX | CAT K. | NCl (Cd.) | Mw/Mn | Tg °C. | R. Cry. −10° C. |
|---|---|---|---|---|---|
| 48 | BHEB | 7.0 | 1.14 | −33.2 | M–S |
| 49 | BHEB | 8.0 | 1.14 | −41.2 | S |
| 50 | BPE-20 | 4.8 | 1.19 | −22.1 | W |
| 51 | BPE-20 | 5.9 | 1.19 | −28.9 | W |
| 52 | BPE-20 | 6.8 | 1.18 | −33.8 | M |
| 53 | BPE-20 | 7.8 | 1.18 | −41 | M–S |

CAT: Catalyst, K.: Kinds
NCl (Dd.) :Designed values of the number of ε-caprolactone units,
R.Cry.: Relative crystallizability Production Example 9: Production of Crosslinked Polyurethane Various crosslinked polyurethanes were obtained from the millable polyurethanes of Examples 10, 13, 18, 23, 25, 28, 33, 37, 42, 46, and 50 in the same manner as described above. These crosslinked elastomers were measured for hardness (Hs: JIS A scale) according to JIS K6253, ball rebound (Rb: %) according to JIS K6255 (based on ISO 4662), tensile strength (Tb: MPa) and elongation (Eb: %) according to JIS K625 1 (based on ISO 37), tear strength using a notched, an angled test piece (Tr: N/mm) according to JIS K6252 (based on ISO 34) Table 9 shows the results obtained.

TABLE 9

| Example | Ini. | Polyol m.p. | Hs | Rb | Tb | Eb | Tr |
|---|---|---|---|---|---|---|---|
| 10 | EG | 37.1, 42.2 | 54 | 70 | 17.4 | 510 | 28.8 |
| 13 | BD | 36.8, 39.2 | 53 | 72 | 21.2 | 520 | 32.5 |
| 18 | PD | 32.6, 37.5 | 53 | 71 | 15.1 | 500 | 26.6 |
| 23 | HD | 36.6, 40.5 | 54 | 73 | 22.8 | 520 | 33.5 |
| 25 | ND | 44.1 | 55 | 70 | 20.6 | 520 | 30.0 |
| 28 | NPG | 23.2, 34.2 | 55 | 69 | 6.8 | 430 | 20.8 |
| 33 | 3-MPD | 24.4, 35.7 | 54 | 70 | 7.6 | 450 | 22.5 |
| 37 | CHDM | 23.3, 31.1 | 55 | 72 | 18.7 | 500 | 32.3 |
| 42 | PXG | 25.6, 36.0 | 53 | 70 | 20.8 | 520 | 30.5 |
| 46 | BHEB | 27.2, 35.3 | 54 | 68 | 19.6 | 530 | 29.8 |
| 50 | BPE-20 | 15.2, 21.3 | 54 | 62 | 18.1 | 530 | 36.7 |

Comparative Tests on Crystallizability

Crystallizability was compared between Group A including Examples 3 and 4 in which the molecular weight distribution of ε-caprolactone was narrow and Group B including Comparative Examples 7 and 8 in which the molecular weight distribution of ε-caprolactone was broad.
1. Measurement of Crystallizability of Amorphous Polymer Chain Before Crosslinking, Measured Using a Differential Scanning Calorimeter (DSC)

Figure 6:
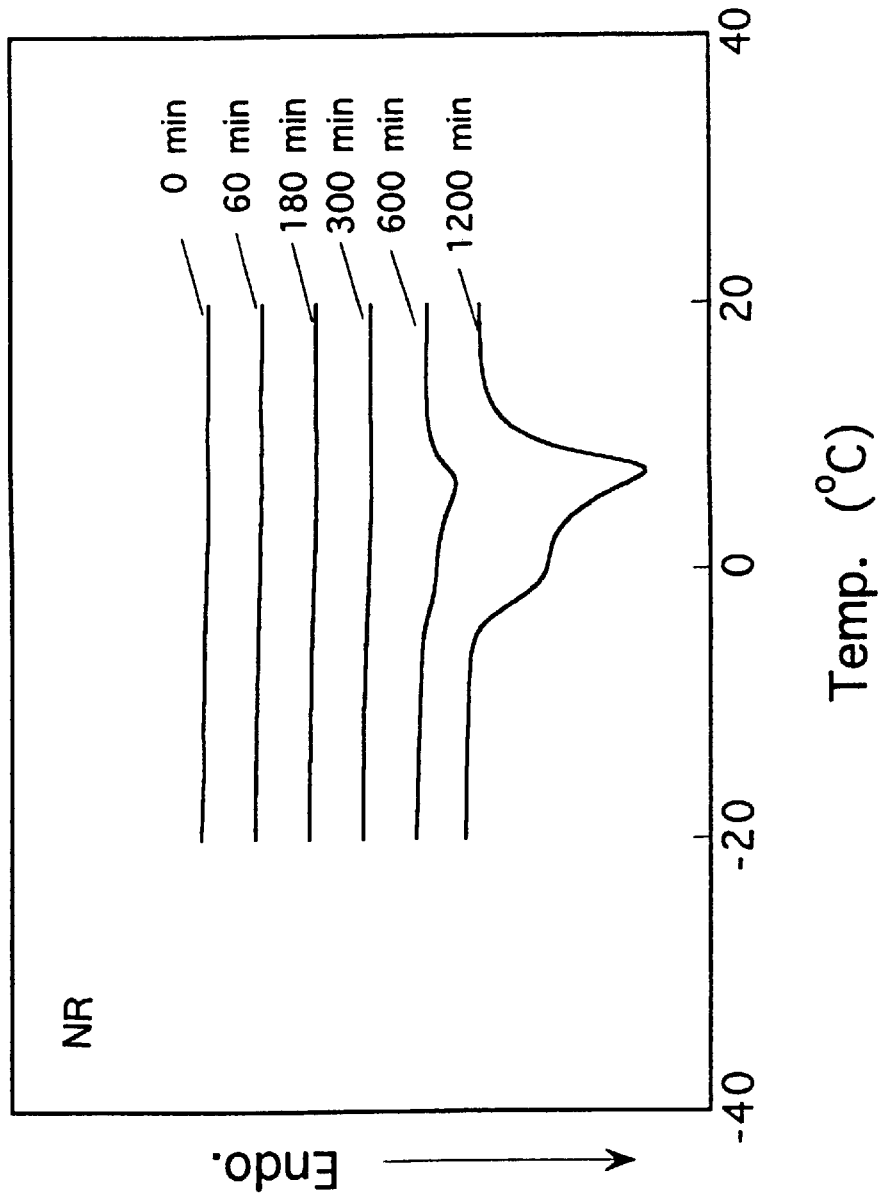
FIG. 6 is a diagram illustrating results of DSC measurement of natural rubber.
Figure 7:
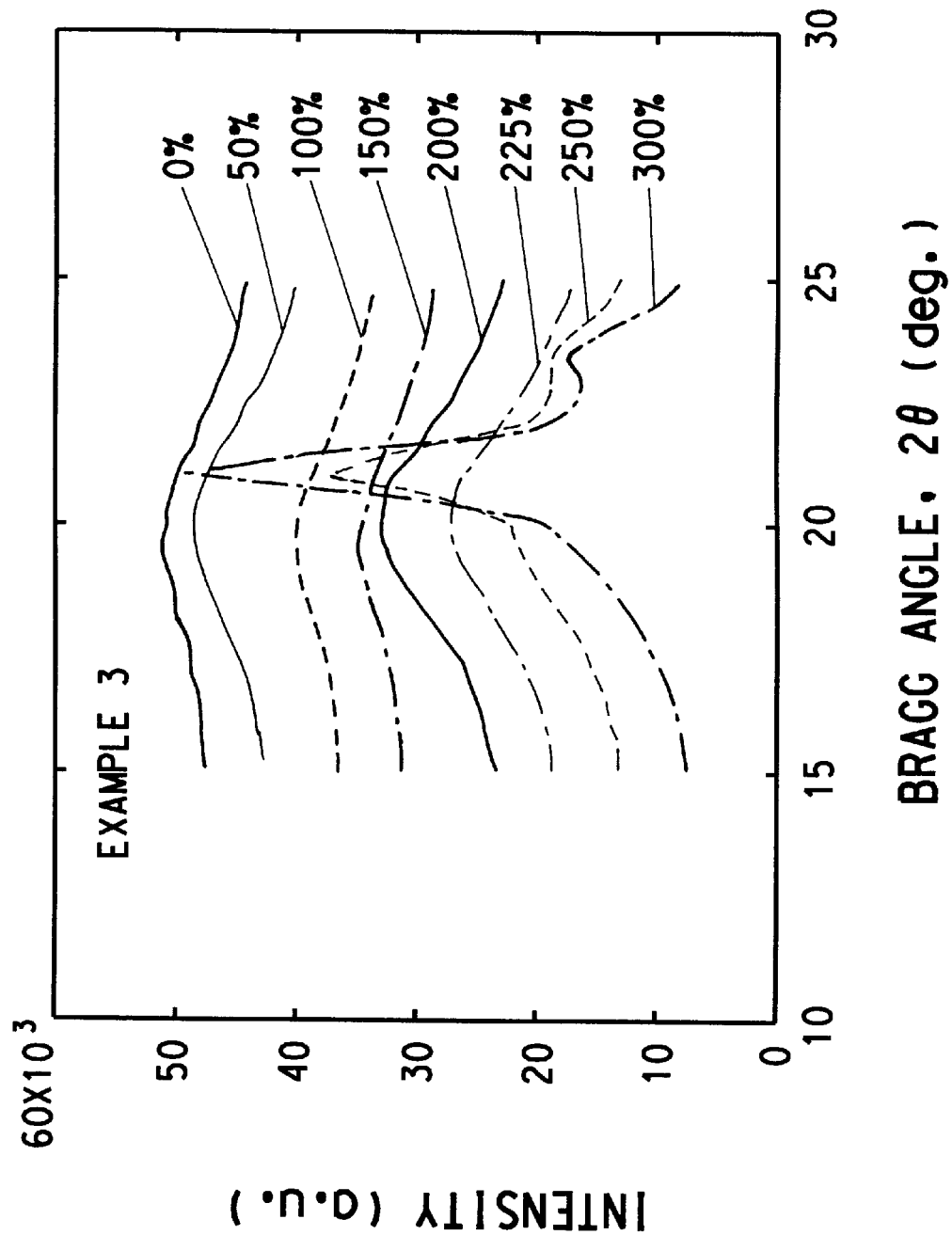
FIG. 7 is a diagram illustrating results of WAXD measurement of Example 3.
Figure 8:
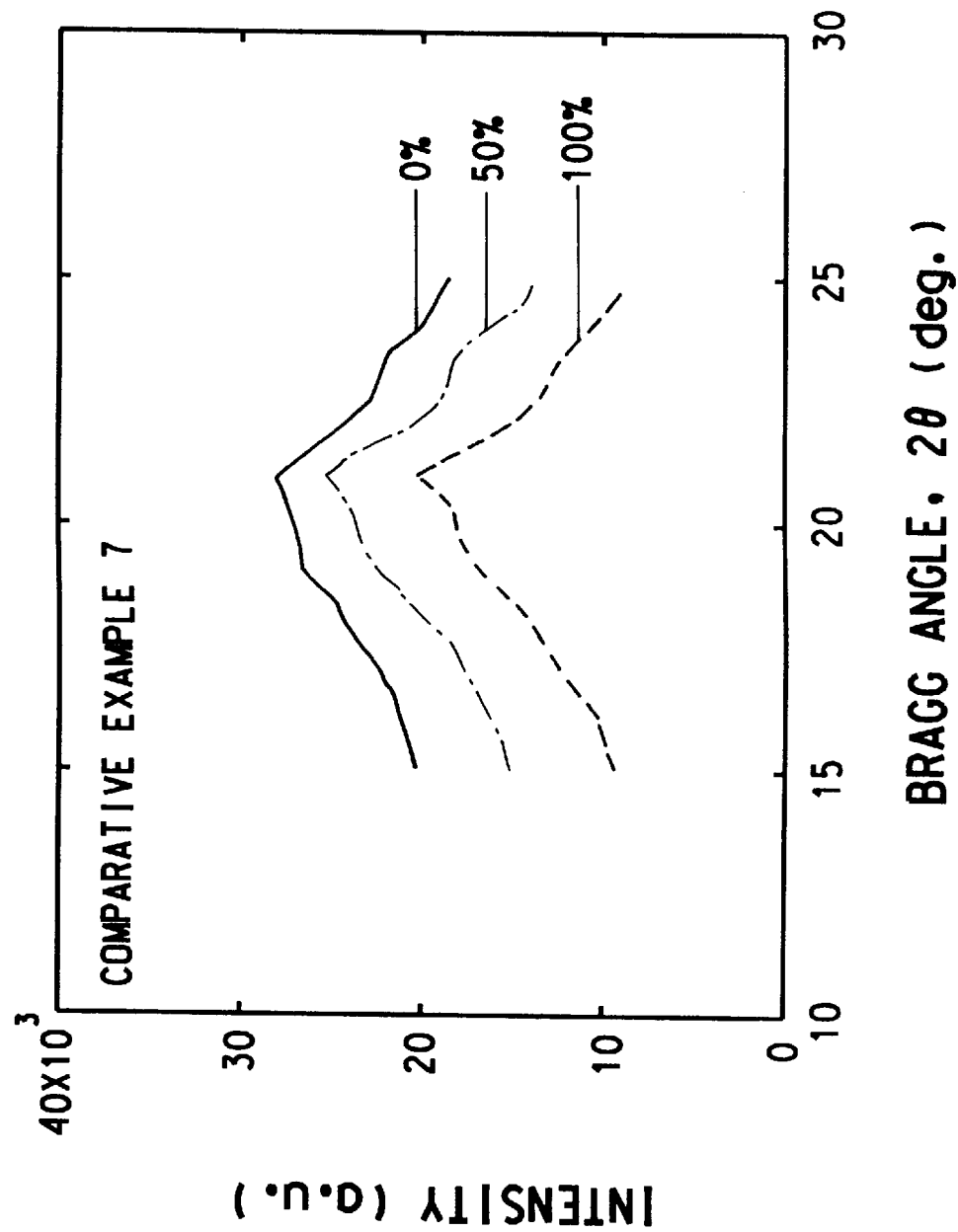
FIG. 8 is a diagram illustrating results of WAXD measurement of Comparative Example 7.
Figure 9:
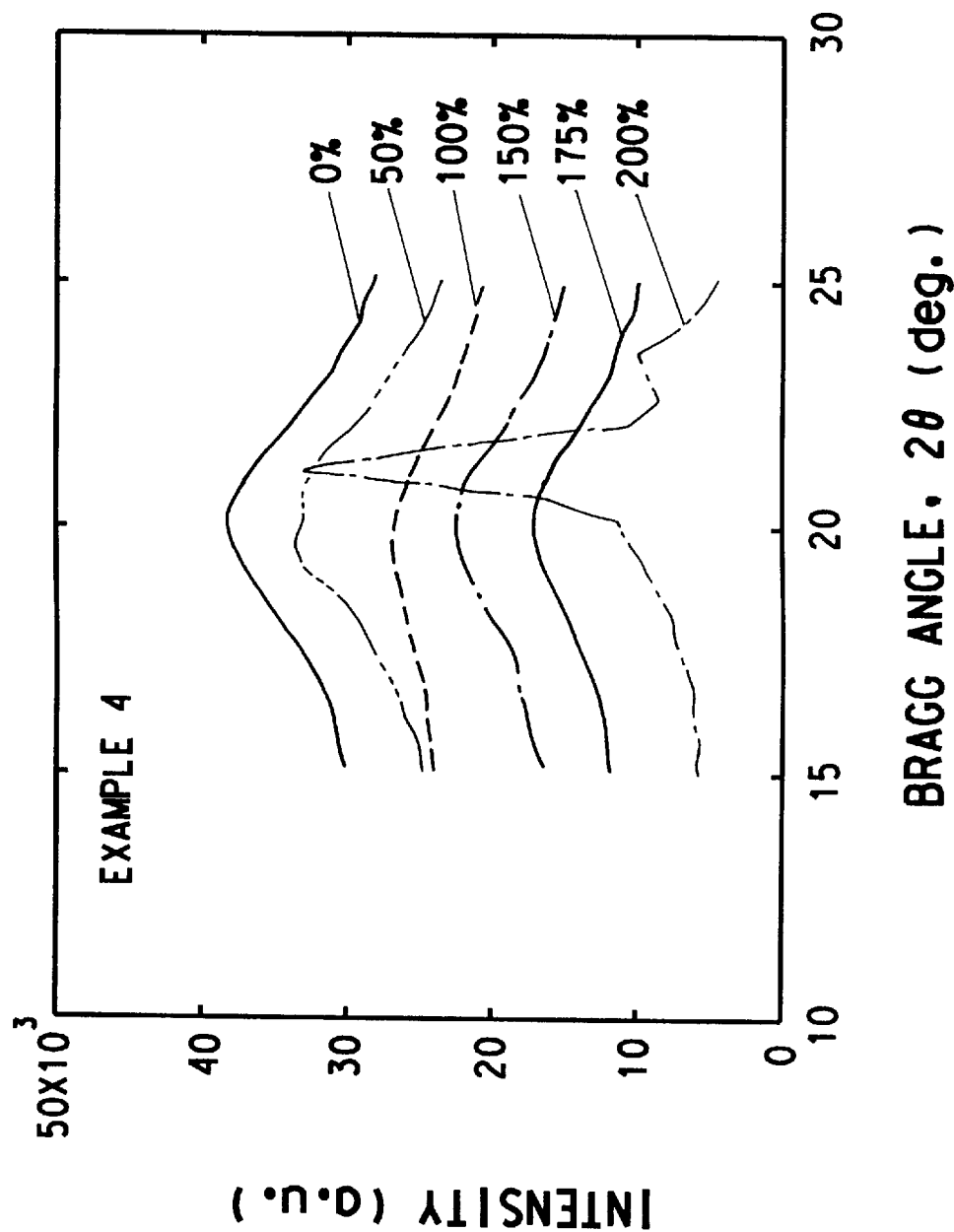
FIG. 9 is a diagram illustrating results of WAXD measurement of Example 4.
Figure 10:
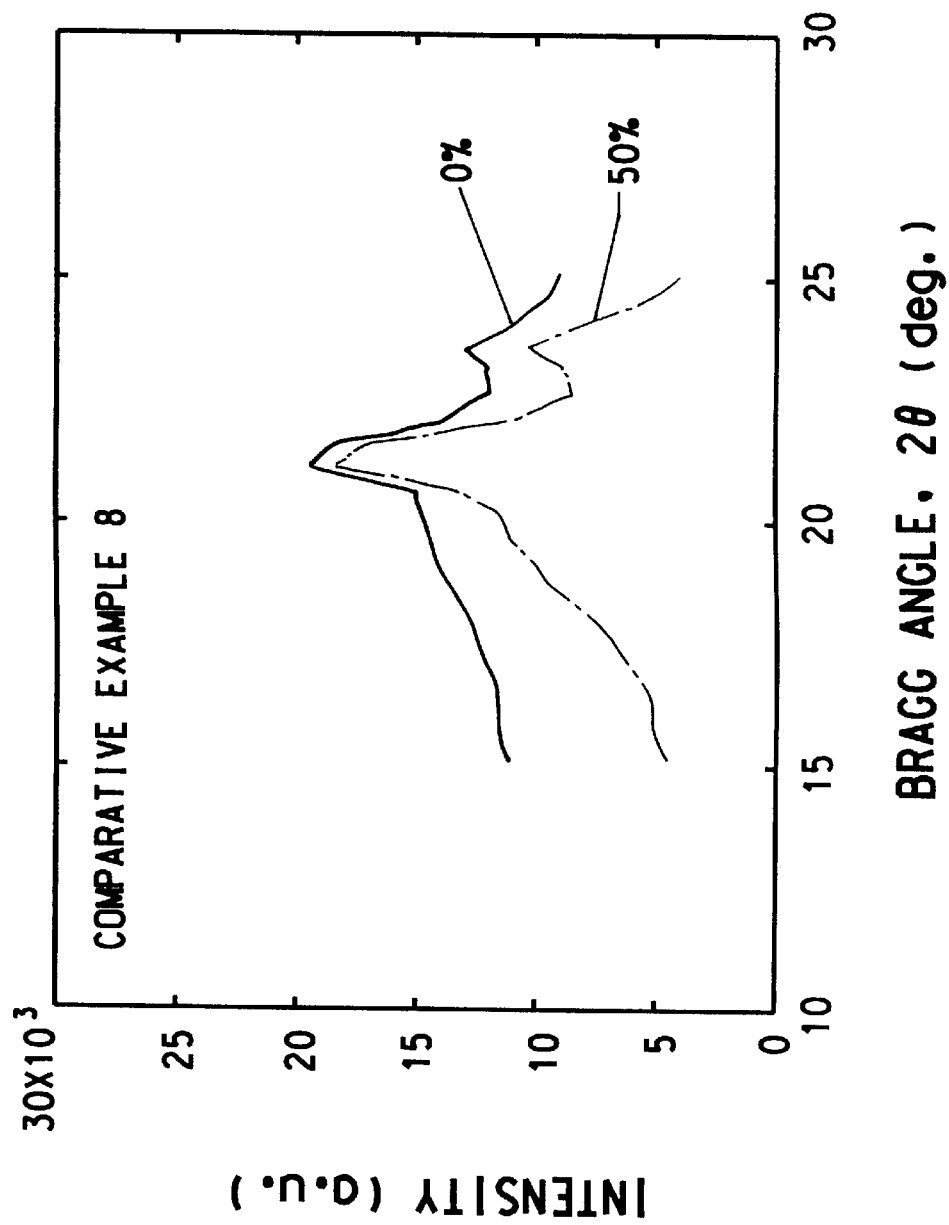
FIG. 10 is a diagram illustrating results of WAXD measurement of Comparative Example 8.

Each sample was measured for the crystallizability of amorphous polymer chain before crosslinking using a differential scanning calorimeter (DSC). FIGS. 2 to 5 illustrate the results of DSC measurements on the behavior of fusion of each sample after holding it at −10° C. for a predetermined time. For comparison, FIG. 6 shows results of DSC measurement on natural rubber (NR) .

It was observed that Comparative Examples 7 and 8 in Group B with a broad molecular weight distribution showed faster crystallization than the samples of Examples 3 and 4 in Group A with a narrow molecular weight distribution. It was observed that the samples with an average number of linkages of 5 were slower in crystallization than the samples with an average number of linkages of 6. From this, it reveals that use of oligomers having a narrow molecular weight distribution enables one to finely control the crystallizability of the amorphous polymer chain by setting a selected average number of linkages.

2. Comparison of Crystallization of Crosslinked Elastomers by Measuring Wide Angle X-ray Diffraction (WAXD)

Each sample was measured for wide angle X-ray diffraction of the amorphous polymer chain. FIGS. 7 to 10 illustrate the results of WAXD measurements. Specimens used were each in the form of a 1 mm-thick and 3 mm-wide processed sheet and measurement were conducted at varied elongation (%) at 22° C.

The samples of Comparative Examples 7 and 8 in Group B with a broad molecular weight distribution showed a diffraction peak due to crystallization even when the samples were not stretched. The peak of 2θ=about 21 degree corresponded to the peak position of ε-caprolactone and, hence, it is presumed that crystallization due to stretching of the crosslinked elastomers is attributable to the crystallization of the repeating unit of caprolactone monomers.

On the other hand, the samples of Examples 3 and 4 in Group A with a narrow molecular weight distribution were in an amorphous state when they were under the conditions of no or low stretching and from their low Tg, it is presumed that they can become a rubber elastic body or elastomer. At an increased elongation, crystallization was observed. This indicates that although the samples of the present invention behave as a rubber elastic body under deformation conditions which ordinary elastomers encounter, they are highly oriented and behave similarly to crystallized polymer when they are excessively or drastically deformed as in the case of wear, breakage, or the like. In addition, the degree of crystallization can be finely controlled by adjusting the average number of caprolactone units.

Comparative Examples 15 to 18

There were prepared ethylene glycol butanediol coadipate (EG:BG=1:1) (Comparative Example 15), 3-methyl-1,5-pentanediol adipate (Comparative Example 16), and neopentyl glycol adipate/caprolactone copolymer (PG/AA:CL= 1:2) (Comparative Example 17). Further, commercially available polyester-type millable polyurethane of ethylene glycol butylene coadipate type (SUMIPAN 64OS: trade name; SUMITOMO BAYER URETHANE CO., LTD.) was used as Comparative Example 18.

Hydrolyzability Test

Figure 11:
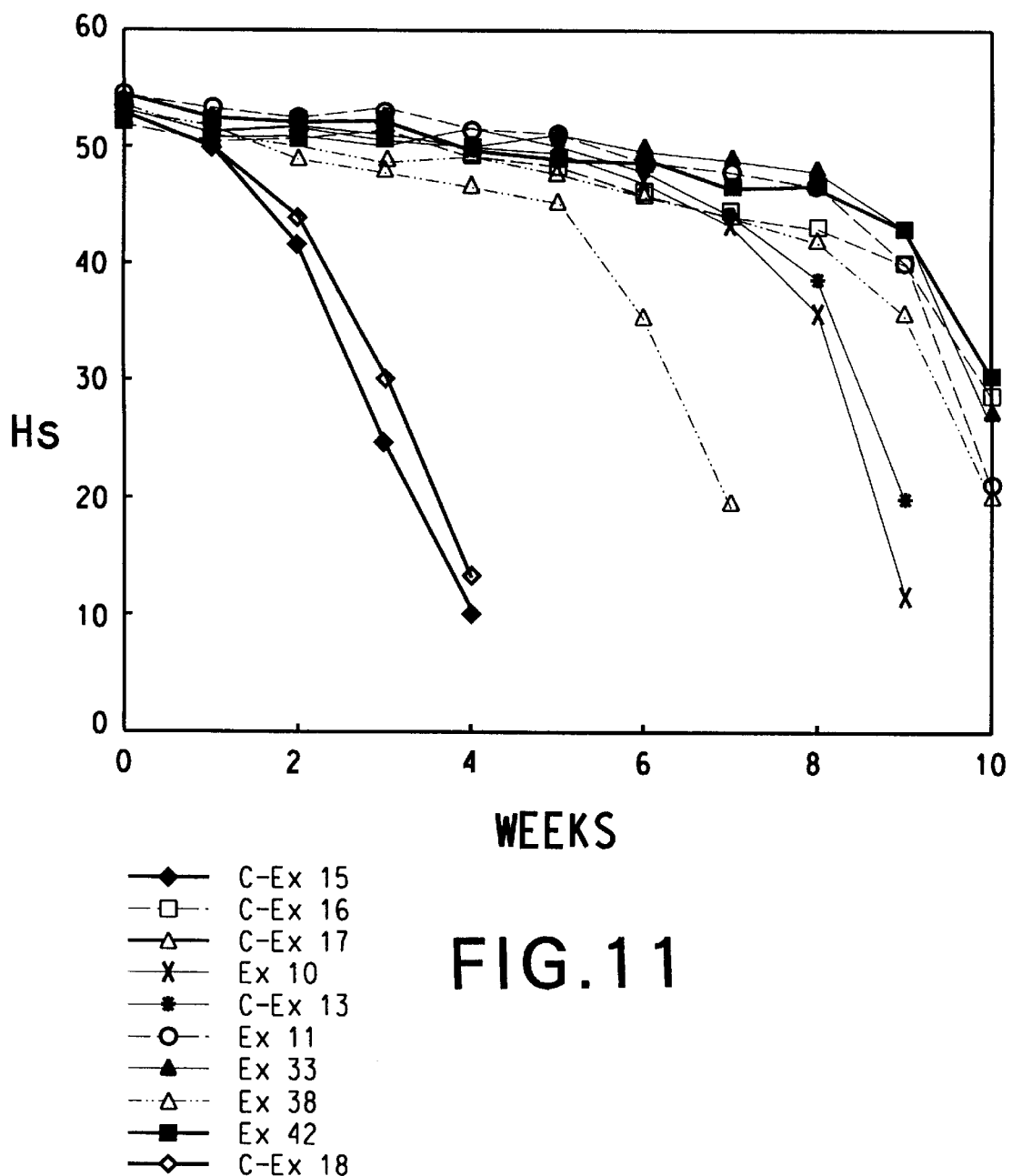
FIG. 11 is a diagram illustrating results of hydrolyzability tests.

The molded products produced from the crosslinked elastomers obtained in Examples 10, 11, 33, 37, and 42 and Comparative Examples 13, and. 15 to 18 were measured for changes in hardness (JIS A) when left to stand in water at 85° C. FIG. 11 illustrates the results obtained. Also, the crosslinked elastomers were measured for hardness (Hs: JIS A scale) according to JIS K6253, ball rebound (Rb: %) according to JIS K6255 (based on ISO 4662), tensile strength (Tb: MPa) and elongation (Eb: %) according to JIS K625 1 (based on ISO 37), and permanent compression strain (Cs: %) under the conditions of 70° C. for 22 hours according to JIS K6262 (based on ISO 815) Table 10 shows the results obtained together with the composition and properties of polyols and the glass transition temperatures of millable polyurethanes.

TABLE 10

| | Polyol Camp. | Property of Polyol GUM | | | | Property of Elastomers | | | | | Hs |
|---|---|---|---|---|---|---|---|---|---|---|---|
| | | Mn | Mw/Mn | mp °C. | Tvg °C. | Hs | Rb | Tb | Eb | Cs | 0° C., 72 hr |
| C-Ex 15 | EG:BG/AA | 2008 | 2.3 | 15 | −42 | 53 | 68 | 16.8 | 530 | 9 | 55 |
| C-Ex 16 | MPD/AA | 2021 | 2.1 | — | −48 | 52 | 65 | 2.7 | 380 | 7 | 53 |
| C-Ex 17 | NPG/AA/CL | 1990 | 2.2 | 2 | −49 | 52 | 66 | 3.8 | 410 | 7 | 52 |
| Ex 10 | EG/CL | 1170 | 1.18 | 37, 42 | −37 | 53 | 68 | 17.9 | 520 | 6 | 54 |
| C-Ex 13 | EG/CL | 1211 | 2.21 | 42, 46 | −38 | 53 | 72 | 19.3 | 540 | 7 | 93 |
| Ex 11 | BD/CL | 1017 | 1.24 | 42, 47 | −35 | 54 | 73 | 23.4 | 520 | 7 | 54 |
| Ex 33 | MPD/CL | 1271 | 1.33 | 24, 36 | −41 | 54 | 74 | 7.6 | 450 | 5 | 54 |
| Ex 38 | CHDM/CL | 1476 | 1.16 | 28, 34 | −36 | 53 | 73 | 18.5 | 500 | 8 | 54 |
| Ex 42 | PXG/CL | 1323 | 1.21 | 26, 36 | −30 | 53 | 70 | 20.8 | 520 | 8 | 55 |
| C-Ex 18 | | SUMIPAN640S | | | −38 | 53 | 67 | 20.8 | 580 | 13 | 54 |

These results reveal that the molded products of the Examples using the millable polyurethane of the present invention are superior in hydrolysis resistance over the molded products of the Comparative Examples. While the molded products of Comparative Examples of 16 and 17 had acceptable hydrolysis resistance because of decreased crystallizability as a result of introduction of a methyl group as a side chain, they failed to exhibit high grade of physical properties inherent to polyurethanes because they hardly showed orientation crystallizability when they were stretched. In contrast, the molded articles of the Examples exhibited orientation crystallizability when stretched so that they showed high grade of physical properties inherent to polyurethanes.

I claim:

1. A method for producing a crosslinkable millable polyurethane rubber having substantially no hard segments and being millable on conventional rubber machinery comprising the steps of:

producing a poly-ε-caprolactone based diol represented by formula (I)

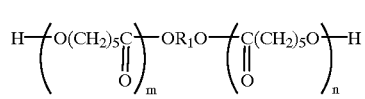
(I)

wherein ( ) is a caprolactone unit; m and n are numbers of caprolactone units; and $R_1$ is a divalent group derived from a polymerization initiator of formula $R_1(OH)_2$, the poly-ε-caprolactone based diol containing a controlled average number of caprolactone units and having a molecular weight distribution Mw/Mn of 1.0 to 1.5; and reacting said poly-ε-caprolactone based diol with a diisocyanate to produce a polyurethane rubber having a restricted crystallizability.

2. A method of claim 1 wherein the molecular weight distribution Mw/Mn of said poly-ε-caprolactone based diol is about from 1.0 to 1.3.

3. A method for producing a crosslinkable millable polyurethane rubber of claim 1, wherein a polymerization initiator represented by formula, $R_1(OH)_2$, for said poly-ε-caprolactone based diol is at least one member selected from the group consisting of straight chain glycols having 2 to 12 carbon atoms; diols having and containing up to 12 carbon atoms and having a side chain; and diols having an unsaturated group containing up to 12 carbon atoms, and wherein said caprolactone unit is present in an average number of about from 3 to 6.

4. A method for producing a crosslinkable millable polyurethane rubber as claimed in claim 3, wherein said polymerization initiator, $R_1(OH)_2$, is at least one member selected from the group consisting of straight chain glycols having 2 to 12 carbon atoms, said glycols having no side chain.

5. A method for producing a crosslinkable millable polyurethane rubber as claimed in claim 1, wherein said polymerization initiator $R_1(OH)_2$, is at least one member selected from the group consisting of diols having an aromatic ring; and alicyclic diols, and wherein said caprolactone unit is present in an average number of 4 to 8.

6. A method for producing a crosslinkable millable polyurethane rubber as claimed in claim 1, wherein said polyol further comprises a chain extender.

7. A method for producing a crosslinkable millable polyurethane rubber as claimed in claim 1, wherein said millable polyurethane has a glass transition temperature, Tg, of no higher than −20° C.

8. A method for producing a crosslinkable millable polyurethane rubber as claimed in claim 1, wherein said diisocyanate is at least one member selected from the group consisting of 2,6-toluene diisocyanate (TDI), 4,4'-diphenylmethane diisocyanate (MDI), p-phenylene diisocyanate (PPDI), 1,5-naphthalene diisocyanate (NDI), and 3,3-dimethyldiphenyl-4,4'-diisocyanate (TODI).

9. A method for producing a crosslinkable millable polyurethane rubber as claimed in claim 1, wherein said poly-ε-caprolactone based diol is prepared under conditions of no higher than 130° C. using a tin catalyst represented by formula (II)

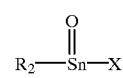
(II)

wherein $R_2$ is a hydrogen atom, an alkyl group, or an aryl group; and X is a hydroxyl group, an alkoxide group or a halogen atom other than fluoride.

10. A method for producing a polyurethane elastomer, comprising the steps:

producing a crosslinkable millable polyurethane rubber according to the method of claim 1; and crosslinking said crosslinkable millable polyurethane rubber with a curing agent and molding the resulting cured polyurethane to form a polyurethane elastomer.

11. A method of claim 10 wherein said curing agent is at least one member selected from the group consisting of organic peroxides, sulfur, organic nitrogen-containing compounds, and isocyanate compounds.

12. A polyurethane molded article comprising a mixture of a crosslinkable millable polyurethane rubber prepared by a method of claim 1 and a curing agent, said mixture being molded and crosslinked.

13. The polyurethane molded article as claimed in claim 12, wherein said curing agent is at least one member selected from the group consisting of organic peroxides, sulfur, organic nitrogen-containing compounds, and isocyanate compounds.

* * * * *

UNITED STATES PATENT AND TRADEMARK OFFICE
CERTIFICATE OF CORRECTION

PATENT NO : 6,008,312
DATED : December 28, 1999
INVENTOR(S): Hitoshi Shirasaka

It is certified that error appears in the above-identified patent and that said Letters Patent are hereby corrected as shown below:

On the cover page, before "Appl. No." insert
--Assignees: Hokushin Corporation, Kanagawa, Japan and
Daicel Chemical Industries, Ltd., Tokyo, Japan--

Signed and Sealed this

Twenty-ninth Day of May, 2001

Attest:

NICHOLAS P. GODICI

Attesting Officer

Acting Director of the United States Patent and Trademark Office